US011366878B2

(12) United States Patent
Epstein et al.

(10) Patent No.: US 11,366,878 B2
(45) Date of Patent: Jun. 21, 2022

(54) METHOD AND APPARATUS FOR DELIVERING ENCODED CONTENT

(71) Applicants: Johnny Stuart Epstein, Toronto (CA); Earl Howard Epstein, Toronto (CA)

(72) Inventors: Johnny Stuart Epstein, Toronto (CA); Earl Howard Epstein, Toronto (CA)

(*) Notice: Subject to any disclaimer, the term of this patent is extended or adjusted under 35 U.S.C. 154(b) by 294 days.

(21) Appl. No.: 16/386,818

(22) Filed: Apr. 17, 2019

(65) Prior Publication Data

US 2019/0243948 A1 Aug. 8, 2019

Related U.S. Application Data

(63) Continuation of application No. 15/081,625, filed on Mar. 25, 2016, now abandoned, which is a continuation of application No. 11/403,640, filed on Apr. 13, 2006, now Pat. No. 9,313,248.

(51) Int. Cl.
| | | |
|---|---|---|
| *G06F 21/10* | (2013.01) | |
| *H04L 9/32* | (2006.01) | |
| *H04N 7/167* | (2011.01) | |
| *H04N 21/44* | (2011.01) | |
| *H04L 9/06* | (2006.01) | |
| *H04N 1/44* | (2006.01) | |
| *H04N 21/2347* | (2011.01) | |
| *H04N 21/258* | (2011.01) | |
| *H04N 21/4405* | (2011.01) | |
| *H04N 21/835* | (2011.01) | |
| *H04L 65/60* | (2022.01) | |
| *G11B 20/00* | (2006.01) | |

(52) U.S. Cl.
CPC ............ *G06F 21/10* (2013.01); *H04L 9/0637* (2013.01); *H04L 9/32* (2013.01); *H04L 65/607* (2013.01); *H04N 1/448* (2013.01); *H04N 7/1675* (2013.01); *H04N 21/2347* (2013.01); *H04N 21/25808* (2013.01); *H04N 21/4405* (2013.01); *H04N 21/44016* (2013.01); *H04N 21/835* (2013.01); *G06F 2221/0724* (2013.01); *G06F 2221/0784* (2013.01); *G11B 20/00086* (2013.01); *G11B 20/00927* (2013.01); *H04L 2209/60* (2013.01); *H04L 2209/603* (2013.01)

(58) Field of Classification Search
None
See application file for complete search history.

(56) References Cited

U.S. PATENT DOCUMENTS

| | | |
|---|---|---|
| 5,592,549 A | 1/1997 | Nagel |
| 5,915,238 A | 6/1999 | Tjaden |
| 6,081,784 A | 6/2000 | Tsutsui |
| 6,385,596 B1 | 5/2002 | Wiser |

(Continued)

OTHER PUBLICATIONS

International Search Report and Written Opinion for Application No. PCT/CA2007/000612, dated Aug. 2, 2007.

(Continued)

*Primary Examiner* — Jamie R Kucab
(74) *Attorney, Agent, or Firm* — Hogan Lovells US LLP

(57) ABSTRACT

A method and system for delivering encoded content are provided. A holdback representing a portion of the encoded content is extracted, thereby damaging the encoded content. The damaged encoded content is distributed. The holdback is transmitted to enable reintegration of the holdback with the damaged encoded content to restore the encoded content.

15 Claims, 19 Drawing Sheets

(56) References Cited

U.S. PATENT DOCUMENTS

| | | |
|---|---|---|
| 6,606,393 B1 | 8/2003 | Xie |
| 6,691,229 B1 | 2/2004 | Nelson |
| 6,725,372 B1 | 4/2004 | Lewis |
| 6,744,906 B2 | 6/2004 | Rhoads |
| 6,824,051 B2 | 11/2004 | Reddy |
| 7,020,777 B2 | 3/2006 | Mihcak |
| 7,080,257 B1 | 7/2006 | Jakubowski |
| 7,095,874 B2 | 8/2006 | Moskowitz |
| 7,107,452 B2 | 9/2006 | Serret-Avila |
| 7,146,502 B2 | 12/2006 | Hayashi |
| 7,237,268 B2 * | 6/2007 | Fields ................. H04L 67/2823 713/153 |
| 7,269,734 B1 | 9/2007 | Johnson |
| 2001/0051996 A1 * | 12/2001 | Cooper .............. H04L 63/0823 705/26.1 |
| 2003/0182142 A1 | 9/2003 | Valenzuela |
| 2003/0236978 A1 | 12/2003 | Evans |
| 2004/0024727 A1 * | 2/2004 | Bowman ................ G06F 21/10 |
| 2004/0039924 A1 | 2/2004 | Baldwin |
| 2004/0131184 A1 | 7/2004 | Wu |
| 2004/0133548 A1 | 7/2004 | Fielding |
| 2004/0236940 A1 * | 11/2004 | Asai ......................... H04L 9/32 348/E7.056 |
| 2004/0250059 A1 | 12/2004 | Ramelson |
| 2005/0123136 A1 | 6/2005 | Shin |
| 2005/0198680 A1 | 9/2005 | Baran |
| 2005/0237577 A1 | 10/2005 | Alasia |
| 2005/0246543 A1 | 11/2005 | Ezaki |
| 2005/0249374 A1 | 11/2005 | Levy |
| 2005/0257059 A1 | 11/2005 | Schaefer |
| 2005/0289076 A1 | 12/2005 | Lambert |
| 2006/0021068 A1 * | 1/2006 | Xu ....................... H04L 63/102 726/30 |
| 2006/0129490 A1 | 6/2006 | Collar |
| 2006/0131397 A1 | 6/2006 | Reddy |
| 2006/0136729 A1 | 6/2006 | Doyle |
| 2006/0173783 A1 | 8/2006 | Marples |
| 2006/0282676 A1 | 12/2006 | Serret-Avila et al. |
| 2006/0294376 A1 | 12/2006 | Sands, IV |
| 2006/0294385 A1 | 12/2006 | Hayashi |
| 2007/0033409 A1 | 2/2007 | Brunk |
| 2007/0047645 A1 | 3/2007 | Takashima |
| 2007/0070218 A1 | 3/2007 | Meijer |
| 2007/0124252 A1 | 5/2007 | Higashi |
| 2007/0136477 A1 | 6/2007 | Bryce |
| 2007/0136597 A1 | 6/2007 | Levy |
| 2007/0140078 A1 | 6/2007 | Muraki |
| 2007/0180246 A1 | 8/2007 | Evans |
| 2007/0198838 A1 | 8/2007 | Nonaka |
| 2007/0202147 A1 | 8/2007 | Kleiner |
| 2007/0208711 A1 | 9/2007 | Rhoads |
| 2007/0241176 A1 | 10/2007 | Epstein |
| 2007/0245403 A1 | 10/2007 | Ginter |
| 2008/0256368 A1 | 10/2008 | Ross |

OTHER PUBLICATIONS

Supplementary European Search Report for European Patent Application No. EP 07 71 9539, completed Nov. 11, 2011.

Liu, Qiong et al., "Digital Rights Management for Content Distribution," Australian Computer Society, Inc., 2003, Adelaide, Australia, 10 pages.

Chang-Tsun Li, "Digital Watermarking Schemes for Multimedia Authentication," Digital Watermarking for Digital Media (Chapter 2), Idea Group Publishing, Mar. 2005, 25 pages.

Schneier, Bruce, "Applied Cryptography," Second Edition, New York, John Wiley & Sons, Inc., 1996.

* cited by examiner

METHOD AND APPARATUS FOR DELIVERING ENCODED CONTENT

CROSS REFERENCE TO RELATED APPLICATIONS

The present application is a continuation of and claims the benefit of priority to U.S. patent application Ser. No. 15/081,625, titled "Method and Apparatus for Delivering Encoded Content," filed Mar. 25, 2016, which is a continuation of U.S. patent application Ser. No. 11/403,640, titled "Method and Apparatus for Delivering Encoded Content," filed Apr. 13, 2006, now U.S. Pat. No. 9,313,248, issued Apr. 12, 2016, which are hereby incorporated by reference in their entirety for all purposes as if fully set forth herein.

FIELD OF THE INVENTION

The present invention relates generally to content delivery and, in particular, to a method and apparatus for delivering encoded content.

BACKGROUND OF THE INVENTION

The digital representation of content is known. Content includes, but is not limited to, music, video, program code, text and graphical documents, images, interactive presentations, etc. The content is generally encoded in accordance with a pre-set standard to create encoded content, such as a file or streaming media. Each standard generally specifies a protocol for encoding content such that it may be stored or transmitted, and a protocol for decoding content that has been encoded to reconstruct the content for playback. These standards are known as document types, and may involve protocols called codecs. The encoded content can be stored on digital media such as a hard disk drive, a floppy disk, an optical media disk, flash memory, volatile memory or, alternatively, can be transmitted via a communications network. As both storage and network bandwidth has associated costs, such codecs are generally designed to compress the digital representation of the content while maintaining a desired level of quality. For music, a number of codecs exist, including MP3, AAC and WAV. Similarly, for still images, the codecs include, but are not limited to, JPEG, GIF, PNG and TIFF. A number of codecs exist for video, including MPEG-2, MPEG-4, AVI and WMV. Similarly, other encoding schemes for other types of computer-readable content exist, such as plain text, document files (e.g., Microsoft Word and Excel documents), program files (e.g., executables and dynamic link libraries) and interactive media (e.g., Microsoft PowerPoint and Macromedia Shockwave files).

A feature of encoded content is that there are currently few limitations on the ability to reproduce any number of identical copies of the encoded content and distribute it freely without identifying the source of the copies. This ability to make unlicensed copies of encoded content is an artifact of how computers operate. The replication of encoded content is also an artifact of how the majority of communications networks are designed, in that they reproduce data transmitted across them, regardless of the type of data.

In many circumstances, it is desired by the owners of encoded content to limit its unauthorized access, copying and dissemination. There are, however, no widely-implemented mechanisms in current communications protocols or hardware that control the authorized use of the data being processed. That is, computers that use communications protocols to connect to networks, such as the Internet, and that exchange encoded content, do not have sufficient logical controls automatically to determine the proprietorship, source or rights associated with the encoded content that is being processed, hence the complete inability to govern its distribution.

In order to control the distribution and use of such encoded content, some content proprietors have implemented digital rights management systems. Such systems store encoded content in an encrypted digital format that corresponds to an encryption key, and rely on a non-standard application to decrypt the encoded content at the time of presentation or playback. These systems, however, require the use of specialized players and/or content viewers, hereinafter referred to as "decoders", that are capable of decrypting the encoded content, thereby limiting the selection of decoders available to end-users and/or causing compatibility issues. For example, music content licensed to a person by a proprietor employing a particular digital rights management scheme may only be accessible via a particular decoder application on a particular operating system, and may not be decodable via a traditional hardware appliance, such as a compact disk player.

Further, as the encoded content in such digital rights management systems includes the totality of the data representing the content, successful cryptanalytic attacks can ultimately permit access to the entire content.

There are a number of other schemes for restricting access to content which require specialized devices such as a non-standard decoders or physical hardware. Still others employ traditional cryptography and are therefore vulnerable to the same class of cryptanalytic attacks against their restriction mechanisms because the attacker has the entirety of the encoded content. In these cases, only the computational problem of generating the correct decryption key needs to be solved in order to unrestrict the entirety of the content, which can then be copied in a repudiable manner.

Current systems for distributing authorized encoded content may include license identifiers only as a non-essential part or extension of the functional part of the data structure of an encoding scheme, like a credit at the end of a film, or a notice in the headers of a file. As the content itself is not affected, however, the content can be separated reasonably easily from the marked encoded content.

File-sharing services, such as Internet-based Kazaa and Limewire, are under pressure from content proprietors to distinguish between encoded content which may be shared freely from that for which the proprietors' permission is required. Without the ability to preclude the unauthorized distribution of encoded content, such services risk liability.

Since existing popular codecs for encoded content do not have standardized features to identify the terms of authorized use and/or the individual licensed to use the encoded content, there is no consistent or automatic way for file-sharing services to assess whether or not the sharing of encoded content via their networks is unauthorized.

Ultimately, in these cases, since the end-user possesses the entirety of the content, the content can potentially be decrypted and copied or distributed in their entirety in a repudiable manner.

SUMMARY OF THE INVENTION

In an aspect of the invention, there is provided a method of delivering encoded content, comprising: extracting a holdback representing a portion of said encoded content, thereby damaging said encoded content; distributing said damaged encoded content; and transmitting said holdback to enable reintegration of said holdback with said damaged encoded content to restore said encoded content.

The holdback can be modified such that a distinct copy of the encoded content is generated when the holdback is reintegrated with the damaged encoded content. The holdback can be modified to include steganographically-embedded information. The holdback can be modified such that when the holdback is reintegrated into the damaged encoded content, the quality of the encoded content is not significantly decreased. The holdback can be modified to include information identifying an authorized end-user, such as by identifying a record in a license database identifying said authorized end-user. The license database can also identify distribution rights for the encoded content for the authorized end-user. The incomplete content can be encrypted prior to extraction of the holdback, such as with a cipher block chain method.

The extracting can comprise extracting a plurality of portions of the encoded content collectively comprising the holdback. The distributing can comprise distributing an optical media disk including the damaged encoded content. Alternatively, the damaged encoded content can be distributed over a communication network.

The holdback can be transmitted over a communication network.

The damaged content can be encrypted using a cipher block chain method, and a holdback can be extracted from the encrypted damaged encoded content.

In accordance with another aspect of the invention, there is provided a method of delivering encoded content, comprising:

generating a unique identifier;
embedding said unique identifier in encoded content selected from a library of encoded content; and
transmitting said encoded content to an end-user associated with the unique identifier.

The end-user can be authorized to access the encoded content prior to generation of the unique identifier, which can identify the end-user.

The unique identifier can identify a record in a license database identifying the authorized end-user.

In accordance with a further aspect of the invention, there is provided a method of delivering encoded content, comprising: dividing said encoded content into segments; generating a set of distinct instances of at least one of said segments; selecting one of said distinct instances from each set of distinct instances; and reassembling said encoded content using said selected distinct instances.

A set of distinct instances can be generated for each of the segments. The set of distinct instances can be encrypyted, and the selected distinct instances can be decrypted before reassembly.

The distinct instances can be delivered to a client prior to selection, and the selected distinct instances can be communicated to the client after selection, wherein the client performs the reassembly.

In accordance with yet another aspect of the invention, there is provided a method of authenticating encoded content, comprising: analyzing encoded content to determine at least one characteristic thereof; transmitting said at least one characteristic; and receiving authentication of said encoded content if said encoded content is authenticated.

A hash calculation can be performed on at least a portion of the encoded content. The header of the encoded content can be parsed to read an identifier therein. The encoded content can be parsed to locate a brand, and the encoded content can be analyzed to read an identifier if the brand is present in the encoded content.

In yet another aspect of the invention, there is provided a computer-readable medium, comprising: encoded content having an identifier embedded therein, said identifier corresponding with a record in a license database identifying the end-user to which said encoded content is licensed.

The identifier can be steganographically embedded in the encoded content. Alternatively, the identifier can be embedded in the header of the encoded content.

Further, the identifier can be embedded in the content prior to its encoding. Still further, the identifier can be determined by performing a hash calculation of at least a portion of the encoded content.

A method is provided for customizing encoded content such that it becomes unique to the end-user. The encoded content enables authorized extraction of information that could identify the end-user, or identify the content as having been tampered with in an unauthorized way.

In accordance with yet another aspect of the invention, there is provided a process for encrypting and encoding uniquely identifiable bits of data into the file format of a digital media file such that they are not obvious or identifiable by the end-user using intended means of access, and not extractable by those who would attempt a cryptanalytic attack, yet easily identifiable by the content owner or licensed distributor of the content, or other authorized monitor.

In accordance with yet another aspect of the invention, there is provided a distribution system that encodes, distributes, and licenses encoded content by pre-distributing or delivering only a portion of the encoded content, while withholding the remainder of it, ensuring that the end-user must obtain the withheld portion to make the content in the file usable. Information identifying the end-user and possibly other attributes is obtained and embedded into the withheld portion before the withheld portion is reintegrated with the remainder of the encoded content to generate a reconstituted and usable file.

BRIEF DESCRIPTION OF THE DRAWINGS

Embodiments will now be described, by way of example only, with reference to the attached Figures, wherein:

FIG. 18 shows an exemplary content map;

DETAILED DESCRIPTION OF THE EMBODIMENTS

Figure 1:
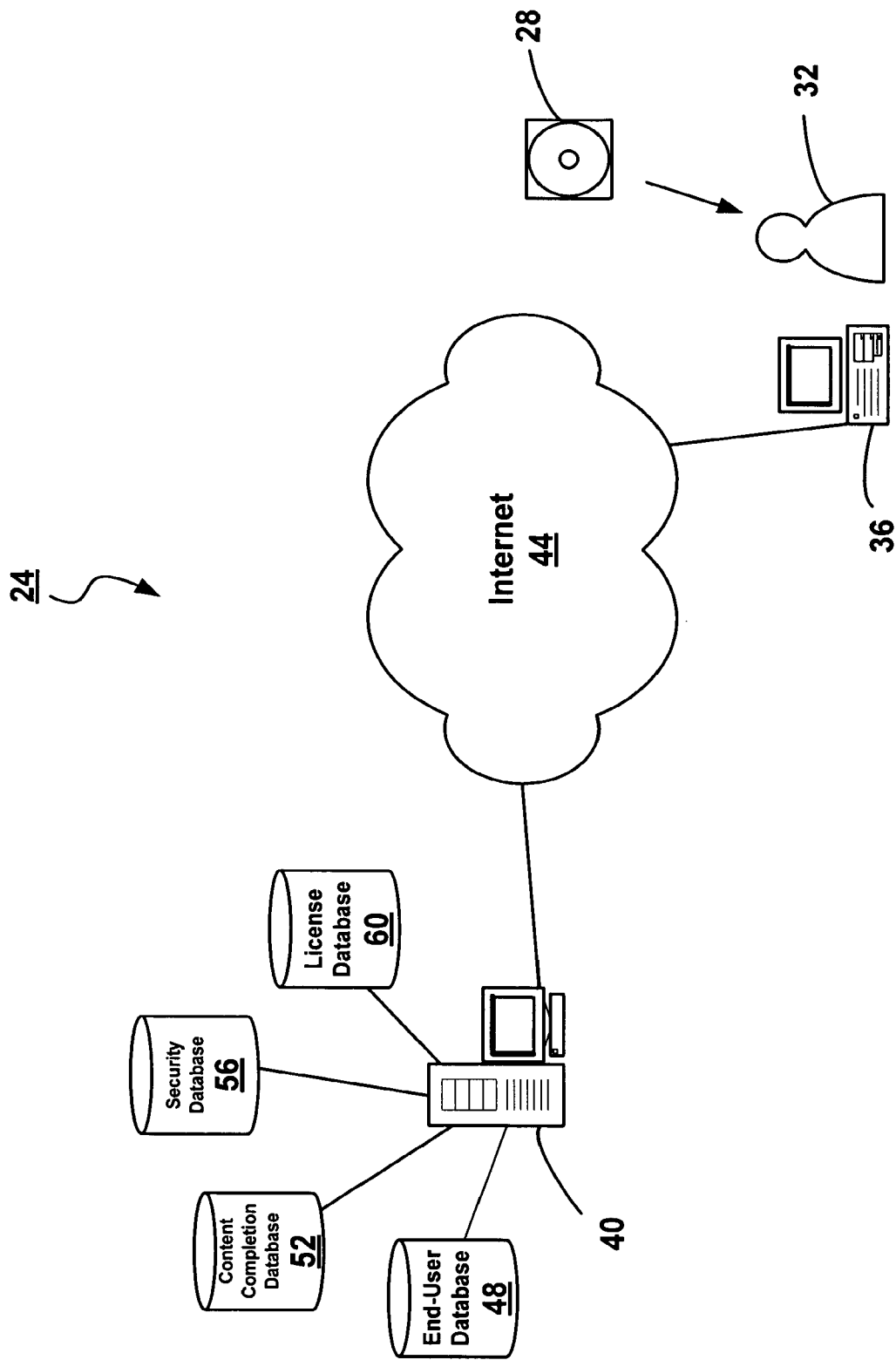
FIG. 1 shows a system for delivering encoded content in accordance with an embodiment of the invention.

Turning now to FIG. 1, a system for delivering encoded content in accordance with an embodiment of the invention is shown generally at 24. In this embodiment, critical data is extracted from the encoded content, thereby damaging the ability to decode the content. The encoded content is then encrypted using a cipher block chain approach and, once again, critical data is extracted from the encrypted incomplete encoded content such that decryption of the encoded content is made infeasible. The encoded content is thus "deconstituted", and can only be "reconstituted" when the critical data is reintegrated. The deconstituted encoded content is then pre-delivered to an end-user. Upon licensing the encoded content, the critical data initially extracted from the encoded content is modified such that when the critical data is reintegrated with the incomplete encoded content, a distinct copy of the encoded content is generated. The critical data is then delivered to the end-user thereby enabling reconstitution of the encoded content.

Encoded content is delivered in the form of an optical media disk 28 to an end-user 32, who can read the optical media disk 28 using a personal computer ("PC") 36. The optical media disk includes one or more files that represent "deconstituted" encoded content; that is, the encoded and possibly encrypted content from which has been extracted critical data, thereby damaging its utility and decryption, if applicable. PC 36 is in communication with an authorization server 40 via the Internet 44.

The authorization server 40 is an enterprise-level server that includes web server and database server functionality. The authorization server 40 manages an end-user database 48, a content completion database 52, a security database 56 and a license database 60. The end-user database 48 stores various information about the end-users of the system 24, including End-User ID, a password or passwords, addresses, information required to process a payment, a transaction history and/or a credit balance. This information is collected by the authorization server 40 during registration of an end-user and purchase of credit that is used to access encoded content. The End-User ID is a unique identifier selected for the end-user 32. The content completion database 52 stores critical data of the encoded content held back (hereinafter referred to as a "holdback", or more particularly a "first holdback") and information associated with the first holdback. The security database 56 stores encryption keys for the encoded content on the optical media disk 28. In addition, the security database 56 stores critical data extracted from the encrypted incomplete encoded content (hereinafter referred to as a "second holdback") and second holdback reintegration maps that specify how to reintegrate second holdbacks into the remainder of the encrypted deconstituted encoded content. The license database 60 stores information about each license issued, including the End-User ID, a Content ID, a list of license parameters, etc. The license database 60 includes a content map for each license issued. All other information stored about the transaction, and license parameters, is accessed through the license database 60 using the content map as a key.

Figure 2:
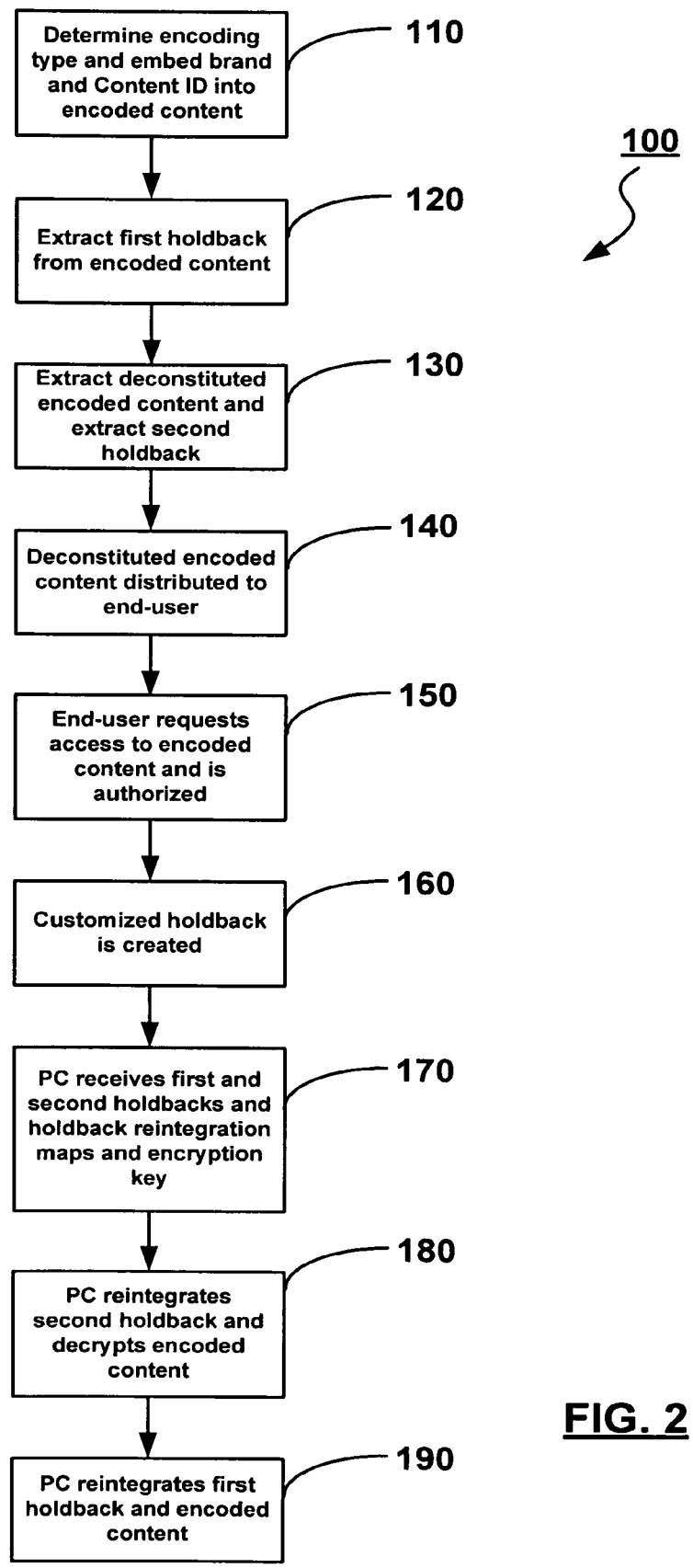
FIG. 2 is a flowchart of the method of delivering encoded content using the system of FIG. 1.

The general method of delivering encoded content 100 using the system 24 is shown in FIG. 2. In the method 100, upon authorization of an end-user, a customized first holdback is generated for the end-user. The customized first holdback contains information such that, when the first holdback is reintegrated with the remainder of the encoded content, a customized copy of the encoded content is created. In particular, the first holdback is customized with an identifier known as the content consumer transaction identifier ("CCTID") that is a collision-resistant hash of the End-User ID, the Content ID, a set of license parameters, etc.

The method 100 commences with the determination of the type of the encoded content and the embedding of a marker referred to hereinafter as a "brand" and Content ID in the encoded content (step 110). For most types of encoded content, the brand and Content ID are embedded in one or more unused header fields. The brand indicates that the encoded content has been processed using the method described herein. The Content ID is a unique identifier generated for the encoded content to distinguish it from the encoded content. Next, a first holdback is extracted from the encoded content (step 120).

Figure 3:
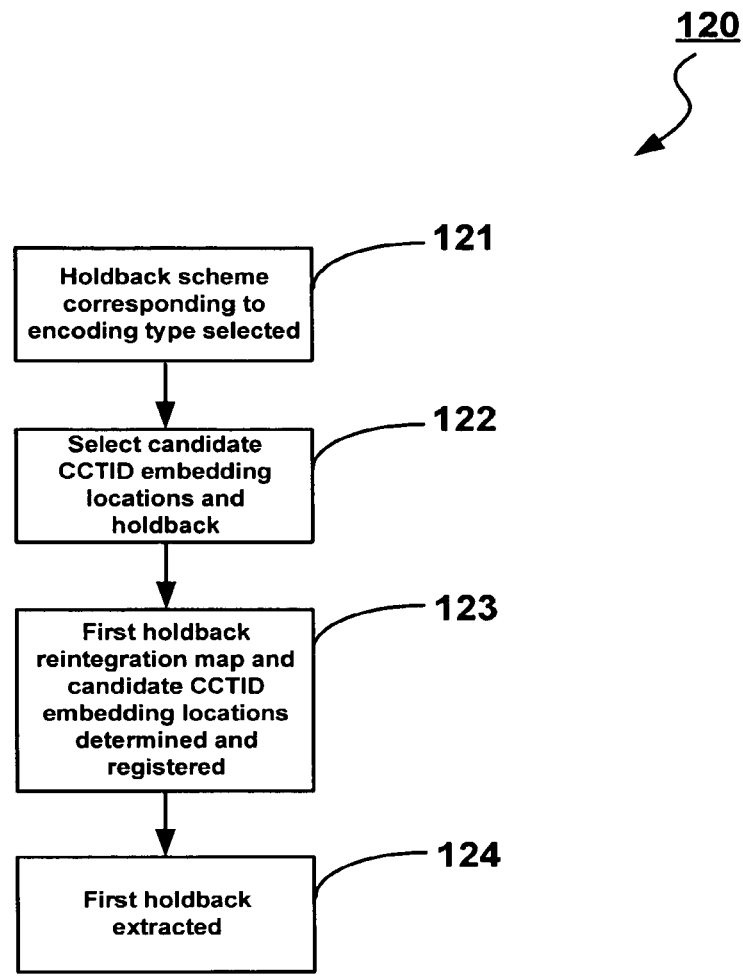
FIG. 3 is a flowchart showing the steps performed during extraction of a holdback from encoded content in the method of FIG. 2.

FIG. 3 shows the steps performed during the extraction of the first holdback from the encoded content. A holdback scheme corresponding to the encoding type is selected (step 121). A holdback scheme is a set of rules that are used to specify how a first holdback is to be determined for a particular content encoding type. In some circumstances, it is desirable to select a first holdback that is small in size in comparison to the size of the encoded content, yet damages the content when extracted therefrom. The holdback scheme is also selected based on suitability for receiving a CCTID.

Figure 4:
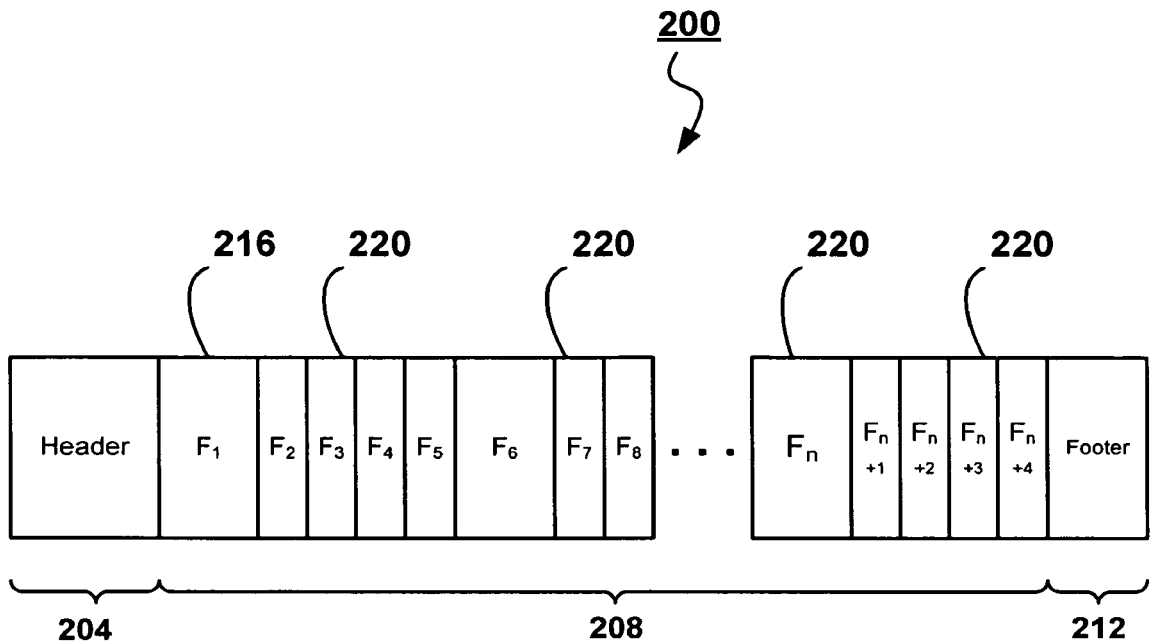
FIG. 4 is an abstract datagram of an MPEG-2 file.

An exemplary abstract datagram 200 for a generic encoded content file (such as MPEG-2) is shown in FIG. 4 in order to illustrate how a holdback scheme is defined. The datagram includes a header 204, a sequence of content frames 208 and a footer 212. The header 204 contains structural parameters for the sequence 208. In MPEG-2 encoded content, the sequence is organized to permit random access and synchronize with audio streams. The content frames 208 contain the information comprising the content, per se. The content frames 208 include a number of logical units, or video frames, of a video sequence. Some of the video frames, namely F1, F6 and Fn, are I-frames 216 that represent complete images. The remaining frames are difference frames (P-frames and B-frames) 220 that represent changes in video information subsequent to the I-frames. By grouping a series of video frames that have a desired level of common visual elements, each video frame subsequent to the first video frame in the series can be characterized by those portions that differ from the I-frame 216 or the immediately-preceding frame. That is, if there is only movement in the foreground of a series of video frames representing a scene of a movie, the first video frame would include an entire image and subsequent difference frames would only include information about those portions of the image that have changed (objects in the foreground and background revealed by movement of the foreground objects).

The holdback scheme selected takes into consideration the type of encoding used to encode the content. In some cases, it is desirable to select a first holdback that is both small in size and, when removed from the encoded content, damages the quality of the content for an end-user. To damage the content decoded from generic encoded content, it is generally sufficient to remove a plurality of blocks of one or more bytes from random locations in the encoded content. However, it is also desired to remove some blocks suitable for embedding the CCTID. In general, all blocks are classified into three types, namely (a) those blocks that cannot change (e.g., file structural parameters); (b) those that are interdependent with other bytes (e.g., cyclic redundancy checks); or (c) those that are free to change. The entire first holdback consists of the union of an arbitrary selection of as many as needed of each type.

This is achieved in different ways for different encoding types. For content encoded using the MPEG-2 standard, the defined holdback scheme specifies that a block of one or more bytes in length is to be removed from a random location in the header 204, and a block of one or more bytes in length is to be removed from each I-frame 216. When a first holdback is extracted from MPEG-2 encoded content using this holdback scheme, it has been found that the quality of the content for an end-user is damaged.

Once the holdback scheme has been selected, the candidate locations at which the CCTID may be embedded and the portion(s) of the encoded content to be held back are selected (step 122). The candidate CCTID embedding locations are determined in accordance with the holdback scheme. It can be desirable to embed the CCTID in the encoded content such that it cannot be readily removed without damaging the encoded content. In addition, it can be desirable to embed the CCTID in a location where it is relatively undetectable to an end-user in comparison to other locations in the encoded content so that there is little or no significant degradation of the content quality. As the CCTID is embedded into the first holdback, the candidate locations for embedding the CCTID are selected in order to achieve these goals within the constraints of the holdback scheme. As the CCTID is embedded in the first holdback prior to delivery of the first holdback to the client, the candidate locations for embedding the CCTID and the portions of the encoded content to be held back are selected such that the candidate CCTID embedding locations are within at least one of the portions of the encoded content to be held back. The candidate CCTID embedding locations are determined in terms of absolute locations in the portions of the encoded content to be held back (i.e., the first holdback). The number of candidate CCTID embedding locations selected well exceeds the number of locations used to embed the CCTID for any one particular end-user. As a result, there will likely be little overlap in the CCTID embedding locations selected for two end-users. In this manner, the embedded CCTIDs are made more resilient against tampering. Further, the set of locations where the CCTID is embedded in the encoded content can be distinct for each user, thereby also providing information which can be used to identify the end-user(s) for which the original encoded content was generated.

One potential attack directed to making the CCTID illegible would be to combine two or more separate distinct copies of the same encoded content to identify bits that differ between the copies and either average the differing values or replace them with random bits. In either case, the locations at which the CCTIDs were embedded can be determined by comparing the resultant copy of the encoded content to the original file.

It has been found that if the CCTID is embedded into a relatively complex portion of the content, its detectability is decreased. In images and/or video frames, such areas of relative complexity could be areas of high texture that do not conform to a regular pattern (for example, blades of grass). For example, greyscale values may be shifted up or down a small increment in such portions during the embedding of the CCTID. By performing such analysis prior to when the CCTID is embedded, an in-depth analysis can be performed to locate those portions of the content which are more suitable for receiving the CCTID.

The first holdback is determined in accordance with the holdback scheme and selected to encompass the candidate CCTID embedding locations.

Upon selecting the first holdback extraction instructions and the candidate CCTID embedding locations, a first holdback reintegration map is determined and registered, along with the candidate CCTID embedding locations (step 123). In particular, the first holdback reintegration map identifies portions of the first holdback to be inserted and locations in the deconstituted encoded content at which the portions of the first holdback are to be reinserted.

Figure 5:
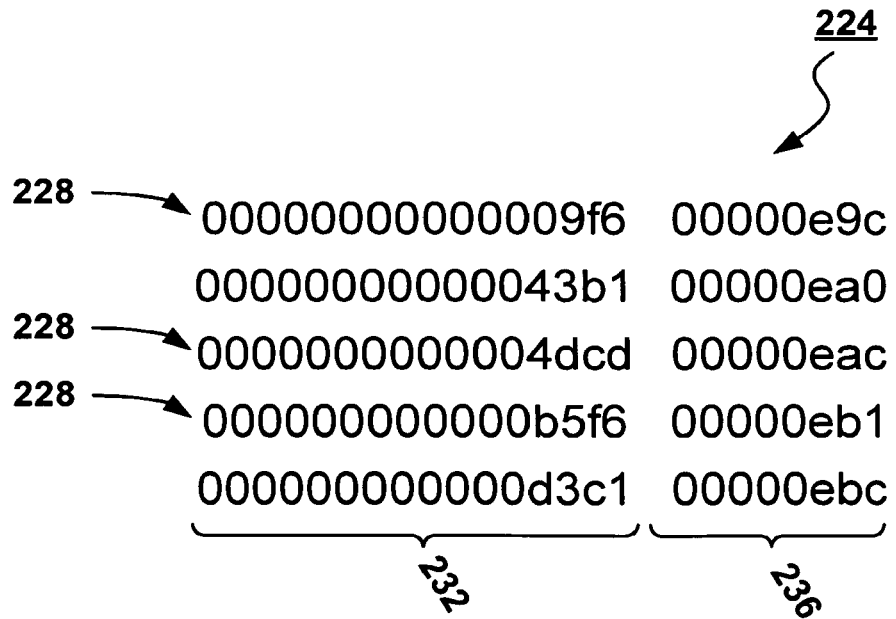
FIG. 5 is a holdback reintegration map determined for a video encoded using MPEG-2.

FIG. 5 illustrates a portion of an exemplary first holdback reintegration map 224 used in the system 24. The first holdback reintegration map 224 consists of holdback portion insertion parameters 228, each including an insertion location 232 and a holdback portion length 236. Each insertion location 232 indicates where a portion of the holdback is to be inserted. The corresponding holdback portion length 236 specifies what portion of the first holdback is to be inserted at the holdback location 232. The portion of the first holdback to be inserted at the location specified in the first set of holdback portion insertion parameters 228 is the portion of the first holdback of the holdback portion length 236 at the start of the encoded content. Subsequent holdback portion insertion parameters correspond to subsequent portions of the first holdback commencing where the previous first holdback portions ended.

Once the first holdback reintegration map and the candidate CCTID embedding locations are determined and registered, the first holdback is extracted from the encoded content (step 124). During extraction of the first holdback, the first holdback portions are extracted and concatenated to form a contiguous first holdback. The remaining portions of the encoded content are concatenated together to form the incomplete encoded content. The incomplete encoded content is deconstituted as it is damaged as a result of the extraction of the first holdback.

Figure 6:
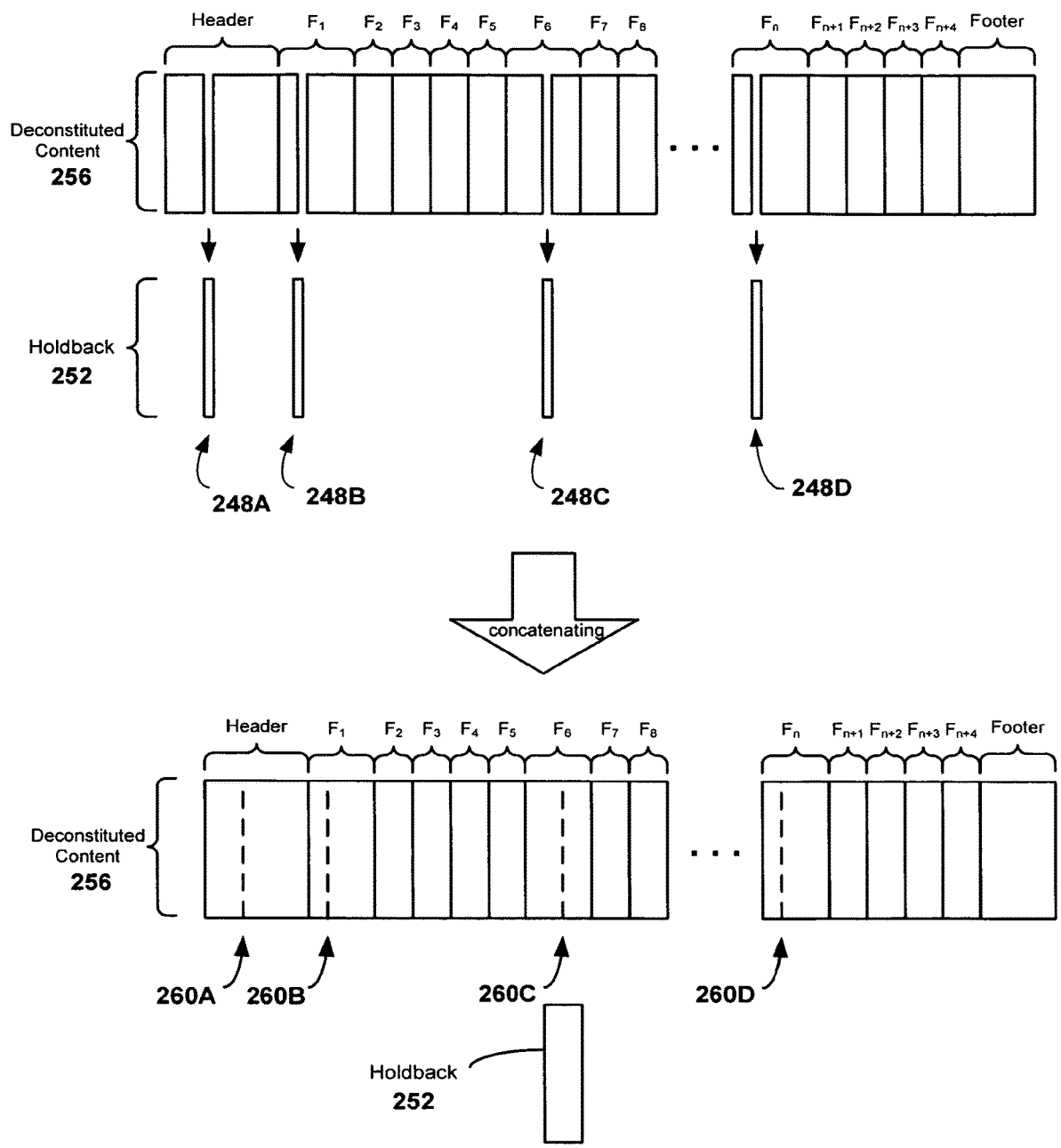
FIG. 6 is an abstract schematic representation of the extraction of the holdback from the MPEG-2 encoded file of FIG. 4 corresponding to the set of re-assembly instructions of FIG. 5.

FIG. 6 illustrates the extraction of the first holdback determined in accordance with the first holdback reintegration map of FIG. 5 for the encoded content of FIG. 4. A plurality of segments 248A to 248D are extracted from the encoded content and concatenated to collectively form a first holdback 252. In particular, segment 248A is extracted from the header 204. The remaining segments of the encoded content are concatenated collectively to form incomplete content 256. Demarcation lines 260A to 260D symbolically indicate the former locations of the first holdback segments 248A to 248D respectively in the deconstituted encoded content.

Referring again to FIG. 2, once the first holdback has been extracted from the encoded content, it is encrypted and from it a second holdback is extracted (step 130).

Figure 7:
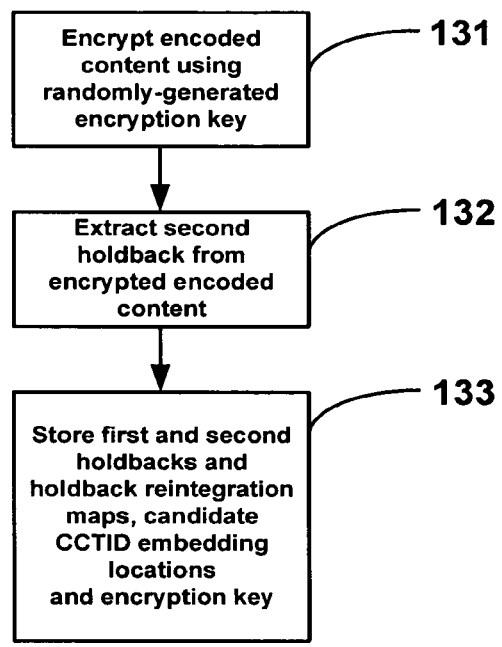
FIG. 7 is a flowchart of the steps performed during the encrypting of encoded content.

FIG. 7 illustrates the method of encrypting the encoded content and extraction of the second holdback therefrom. An encryption key is randomly generated and used to encrypt the incomplete encoded content 256 prior to distribution on optical media disk 28 (step 131). The incomplete encoded content 256 is encrypted using a symmetric cipher in cipher block chain mode. In cipher block chain mode, the encryption of any particular block of data is dependent on the encrypted value of all the preceding data. As a result, the omission of any segment of the encrypted encoded content makes decryption of the encoded content infeasible. In addition, the name and extension of the file are changed so as to obscure the encoded content. The second holdback is then extracted from the encrypted incomplete encoded content (step 132). The second holdback is an arbitrarily selected set of data blocks that are extracted from the encrypted incomplete encoded content. A second holdback reintegration map is generated to indicate how the second holdback is to be reintegrated with the encrypted incomplete encoded content to restore the encrypted incomplete encoded content to its original form. By extracting the second holdback from the encrypted incomplete encoded content, it is deconstituted; that is, it is damaged and cannot be restored to its original form without the extracted data. The first holdback reintegration map, the candidate CCTID embedding locations, the encryption key, the first holdback, the second holdback and the second holdback reintegration map are stored (step 133). In particular, the first holdback reintegration map, the candidate CCTID embedding locations and the first holdback are stored in the content completion database 48 and the encryption key, the second holdback and the second holdback reintegration map are stored in the security database 52. The second holdback, the second holdback reintegration map, the encryption key, the first holdback and the first holdback reintegration map are all that is required by the PC 36 to reconstruct the encoded content from the deconstituted encoded content. The candidate CCTID embedding locations enable the authorization server 40 to select locations and embed the CCTID in the first holdback prior to its delivery to the PC 36.

Referring again to FIG. 2, once the first holdbacks have been extracted, the incomplete encoded content has been encrypted and the second holdback has been extracted, the encrypted deconstituted encoded content is placed onto the optical media disk 28 and distributed to the end-user 32 (step 140). Distribution of the optical media disk 28 can be performed in a number of ways, including its inclusion with periodicals, manual distribution at an event, mail distribution via a subscriber list, etc. The optical media disk 28 includes the deconstituted encoded content and a content access application for reconstituting the encoded content. In addition, the optical media disk 28 is provided with a media identifier. The media identifier is registered with the authorization server 40 along with a list of the encoded content on the optical media disk 28.

In order for the end-user 32 of the PC 36 to be able to enjoy any of the encoded content on the optical media disk 28, the end-user 32 requests access to the encoded content and is authorized (step 150). Authorization occurs via the content access application. This application automatically launches when the optical media disk 28 is inserted into PC 36 and permits the end-user 32 to obtain authorization for accessing encoded content stored in deconstituted form on the optical media disk 28. The end-user 32 logs in by entering the End-User ID and password at a login screen.

Figure 8:
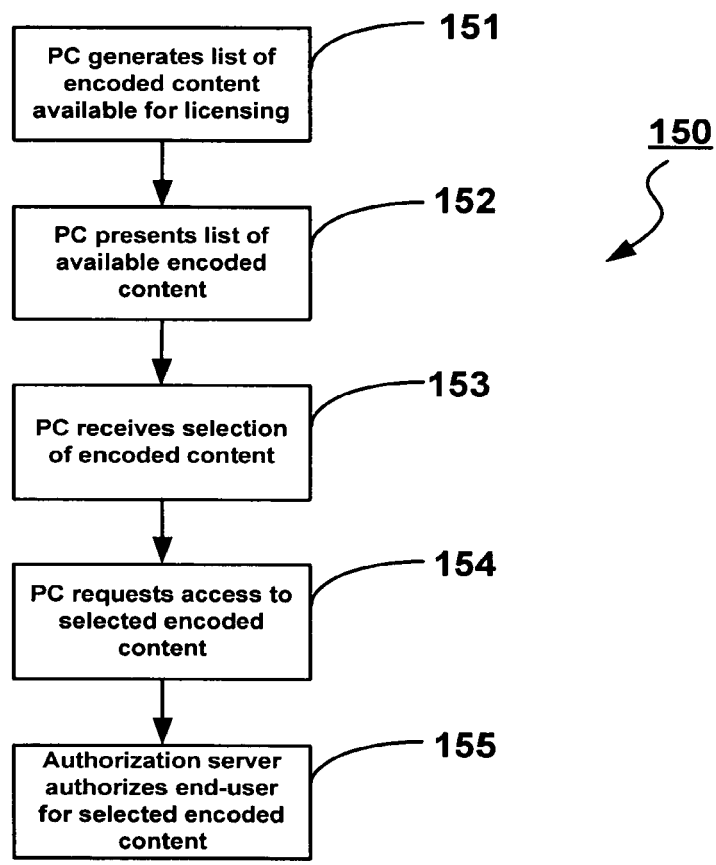
FIG. 8 is a flowchart of the steps performed during the requesting of access to encoded content.

The method of authorizing access to encoded content on the optical media disk 28 by the PC 36 is illustrated in FIG. 8. The method begins with the generation of a list of encoded content available for licensing by the content access application on the PC 36 (step 151). The content access application queries the optical media disk 28 to obtain the media identifier, and transmits the media identifier to the authorization server 40 via the Internet 44, along with the End-User ID to determine what encoded content is available on the optical media disk 28, and what encoded content on the optical media disk 28 the end-user 32 is currently licensed to access. The authorization server 40 then responds with a list of what encoded content is available on the optical media disk 28, along with what encoded content the end-user 32 is currently licensed to access.

Upon obtaining the list of encoded content, the content access application parses the list and presents the list of encoded content available on the optical media disk 28 to the end-user 32 (step 152). The list of encoded content presented by the content access application indicates that encoded content that the end-user 32 is currently licensed to access, as provided by the authorization server 40.

FIG. 8 illustrates an exemplary content selection window 300 that presents a list of encoded content 304, music videos in this case, which is available on the optical media disk 28, along with the cost of a license to access the encoded content. An accept button 308 and a cancel button 312 permit acceptance or cancellation of any selections made by the end-user 32. The list of music videos is sorted by genre and artist.

Figure 9:
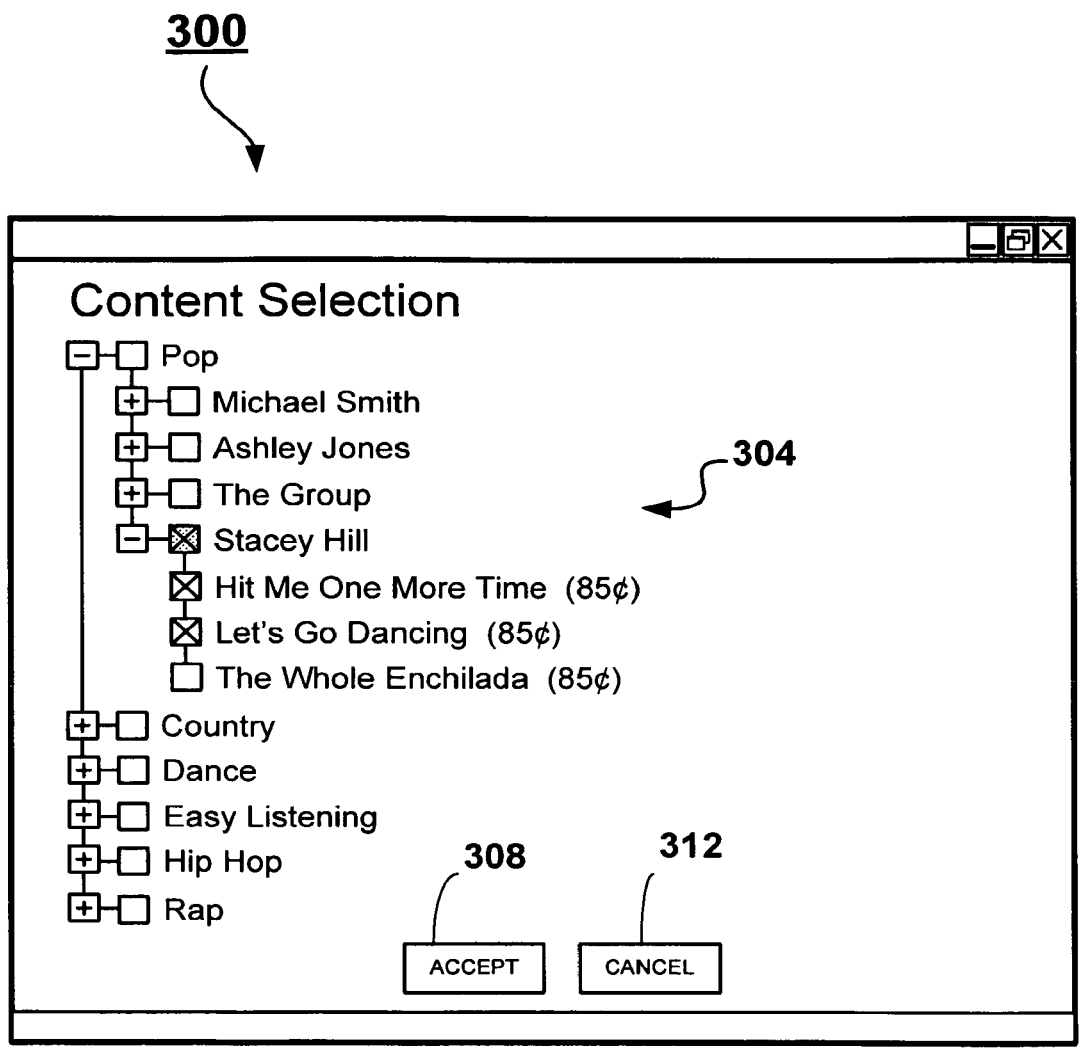
FIG. 9 is a window presenting a list of encoded content that can be selected for accessing.

Referring to FIGS. 8 and 9, the content access application then receives the selection of encoded content that the end-user 32 wishes to access (step 153). Check boxes beside each music video permit the end-user 32 to indicate what encoded content he/she wishes to access. Upon selection of the encoded content that the end-user 32 wishes to access, the end-user 32 clicks on the accept button 308. An authorization confirmation dialog box (not shown) appears, prompting the end-user 32 to confirm that the end-user 32 wishes to spend credit on the selected encoded content. Upon confirmation, the end-user 32 is deemed to have confirmed their selection of encoded content.

The content access application then requests access to the selected encoded content (step 154). The request from the PC 36 includes the unique End-User ID of the end-user 32 and the Content ID(s) for the selected encoded content.

The end-user 32 is then authorized to access the requested encoded content by the authorization server 40 (step 155). At this point, a number of events occur. The authorization server 40 receives the request from the PC 36 to access encoded content and authorizes the end-user 32 for the selected encoded content. The End-User ID transmitted with the request to access encoded content is used to retrieve end-user information from the end-user database 48. The end-user database 48 contains information for each end-user 32 including information required to process a payment, a transaction history and a credit balance. In order to obtain authorization to access encoded content, the end-user purchases credit via a website operated by the authorization server 40. The end-user database 48 is then updated to reflect the new credit. If the end-user has sufficient credit to purchase access to the selected encoded content (that is, a license), a transaction history is updated, and the end-user's credit balance is debited the appropriate amount for the selected encoded content. If the end-user does not have sufficient credit to purchase access to all of the selected encoded content, the authorization server 40 can direct the content access application to display a message that insufficient credit is available, with a link to a page where the end-user can purchase additional credit.

Referring back to FIG. 2, the authorization server 40 then generates a customized first holdback (step 160). The authorization server 40 generates a CCTID for the license by calculating a collision-resistant hash of the End-User ID, the Content ID and license information, and then stores the CCTID in the license database 60.

The authorization server 40 uses the Content ID to retrieve the corresponding first holdback, first holdback reintegration map and the candidate CCTID embedding locations from the content completion database 52. In addition, the authorization server 40 also retrieves the encryption key, the second holdback and the second holdback reintegration map from the security database 56. The authorization server 40 then selects a subset of the candidate CCTID embedding locations for the particular end-user and registers the selected subset in the license database 60. The authorization server 40 then embeds the CCTID into the first holdback at the selected candidate CCTID embedding locations. During embedding of the CCTID in the first holdback, error-checking codes frequently used in media files to identify corrupt frames are adjusted to reflect the embedding of the CCTID. MPEG-2 for instance allows a cyclic redundancy check.

The customized first holdback is then bundled by the authorization server 40 with the first holdback reintegration map, the encryption key, the second holdback and the second holdback reintegration map to generate a customized reconstitution package. The authorization server 40 then transmits the customized reconstitution package to the PC 36.

The PC 36 receives the customized reconstitution package containing the customized first holdback, the first holdback reintegration map, the encryption key, the second holdback and the second holdback reintegration map (step 170). The PC 36 reintegrates the second holdback in accordance with the second holdback reintegration map and decrypts the incomplete content using the encryption key provided in the holdback package (step 180). The holdback package is parsed by the PC 36 to obtain the encryption key, the second holdback and the second holdback reintegration map. The PC 36 reintegrates the second holdback with the remainder of the encoded deconstructed encoded content in accordance with the component reintegration map. Next, the PC 36 uses the encryption key to decrypt the incomplete encoded content using a symmetric cipher in cipher block chain mode. The PC 36 then restores the incomplete encoded content by inserting the first holdback into the incomplete encoded content using the first holdback reintegration map (step 190).

The completed encoded content is thereafter stored on non-volatile storage of the PC 36 for accessing at a later time.

Once the deconstituted encoded content has been reconstituted, the encoded content is generally as it was before it was deconstituted, with the exception that the CCTID has been steganographically embedded in the encoded content such that it is generally undetectable by an end-user.

By distributing encoded content in a deconstituted form, the end-user is not provided with all of the data required to enable decoding of the encoded content prior to authorization. By cipher block chain encrypting the incomplete encoded content and extracting a second holdback, the decryption of the incomplete encoded content to its original form is made infeasible. Further, as the end-user does not possess all of the encoded content prior to reconstitution, the end-user cannot reconstruct the entire encoded content from the deconstituted encoded content. Only once the deconstituted encoded content is reintegrated with the second holdback, decrypted and reconstituted can it be properly decoded and enjoyed by an end-user.

Due to the manner in which the CCTID is embedded in the encoded content, wherein actual content is changed, the CCTID in the resultant encoded content is resilient to a decoding/re-encoding attack. Further, as the CCTID is embedded in a set of locations that is distinct for each end-user, the encoded content is resilient to combination attacks where two legitimate copies of the encoded content licensed to two end-users are combined in some manner, and generally can permit identification of both end-users.

It is of interest in many cases for administrators of networks, either physical such as a local area network, or virtual such as a file-sharing network operated over the Internet, to ensure that the encoded content being shared on their networks is properly licensed. For such cases, a method and apparatus are provided to enable the authentication of encoded content.

Figure 10:
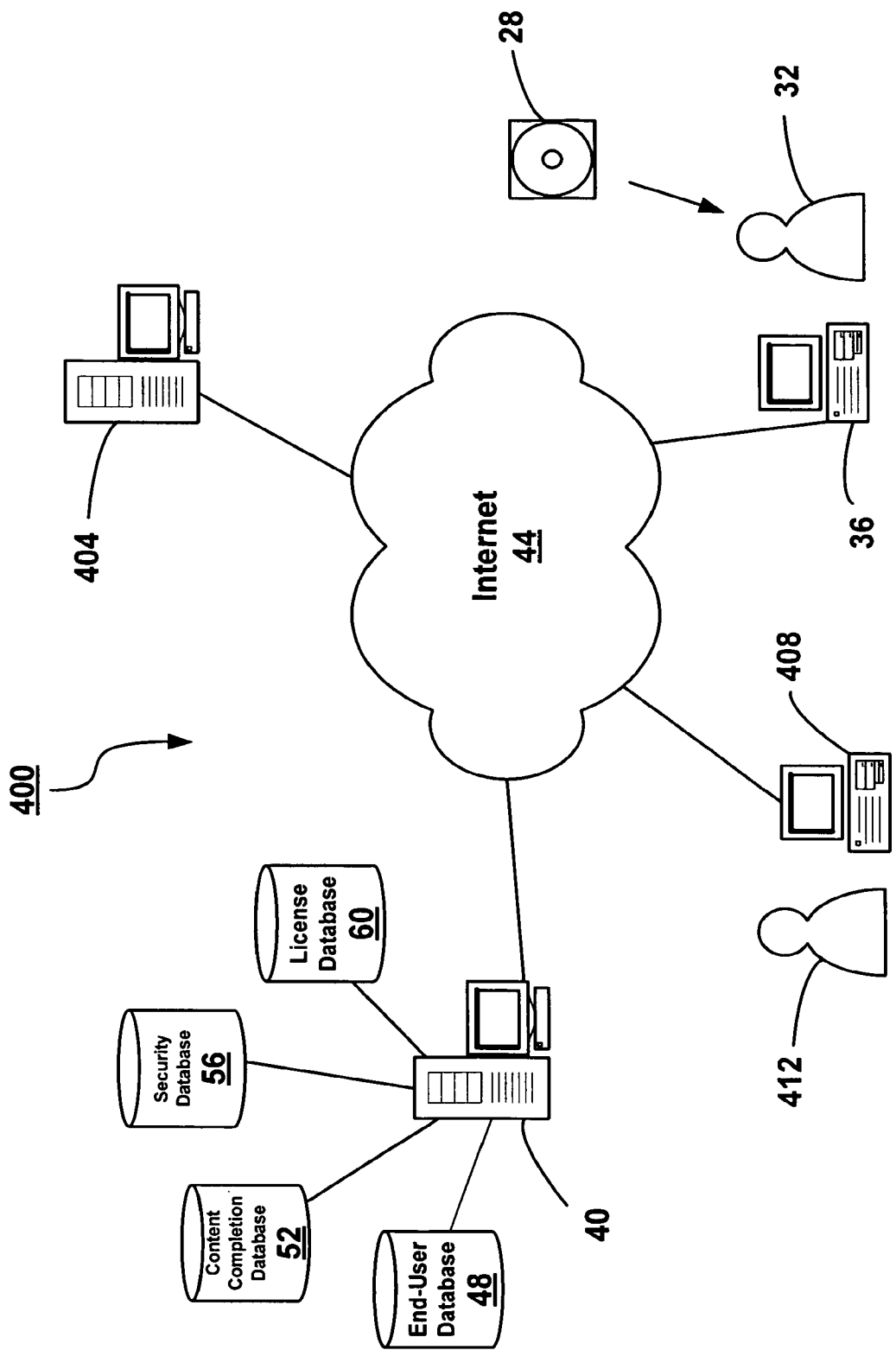
FIG. 10 shows the system of FIG. 1 with additional components for operating a peer-to-peer file-sharing network.

FIG. 10 shows a system 400 that is similar to the system 24 of FIG. 1 and additionally includes an arbiter computer 404 and a remote personal computer ("remote PC") 408 operated by a remote user 412. Both the arbiter computer 404 and the remote PC 408 are in communication with the PC 36. The end-user 32 of the PC 36 can offer to make available encoded content stored thereon to other users via a file-sharing network operated via the arbiter computer 404. Upon launch of a file-sharing application, PC 36 communicates to the arbiter computer 404 a list of encoded content that the end-user 32 has selected for sharing. This list is combined with lists of encoded content made available by other end-users to form an aggregate list of encoded content available on the file-sharing network. The remote user 412 can connect to the file-sharing network by executing a file-sharing application on the remote PC 408. The remote PC 408 connects to the arbiter computer 404 and communicates a list of encoded content that the remote user 412 has selected for sharing. In order to locate and retrieve encoded content from the file-sharing network, the remote user 412 specifies query criteria via the file-sharing application which, in turn, queries the arbiter computer 404. The arbiter computer 404 responds with a list of encoded content matching the query of the remote user 412. Upon selection by the remote user 412 of encoded content to be downloaded, the remote PC 408 requests the selected encoded content from the arbiter computer 404. The arbiter computer 404 then requests the selected encoded content from the PC 36 for transmission to the remote PC 408.

Figure 11:
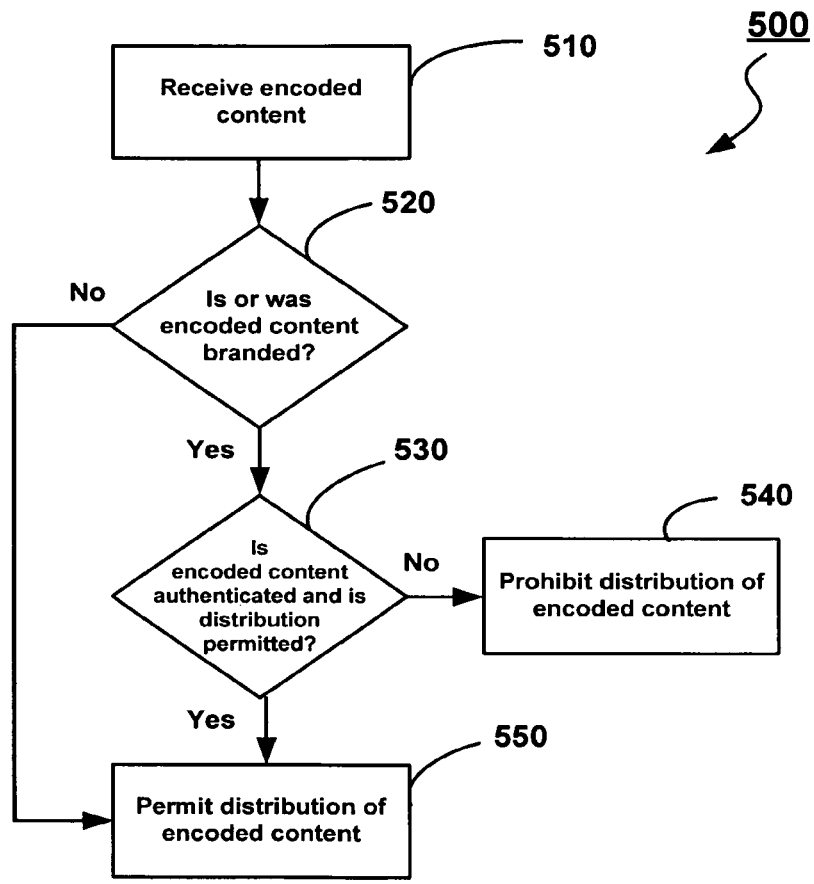
FIG. 11 is a flowchart showing the method of checking authorization to access encoded content in the system of FIG. 10.

FIG. 11 illustrates the method of authenticating and controlling distribution of encoded content via the system 400 generally at 500. The encoded content is received by an arbiter computer 404 that is configured to monitor and control traffic and storage of encoded content on the file-sharing network (step 510). Upon receiving the encoded content, the arbiter computer 404 determines whether the encoded content is branded (step 520). If the encoded content is branded, the arbiter computer 404 authenticates and determines the distribution permissions for the encoded content (step 530). If the arbiter computer 404 determines that the encoded content is not authentic or that the encoded content may not be redistributed, the arbiter computer 404 prohibits transmission of the encoded content (step 540). If, instead, the arbiter computer 404 determines that the encoded content is authenticated and redistribution is permitted, or if the encoded content is not branded, the arbiter computer 404 permits transmission of the encoded content (step 550).

Figure 12:
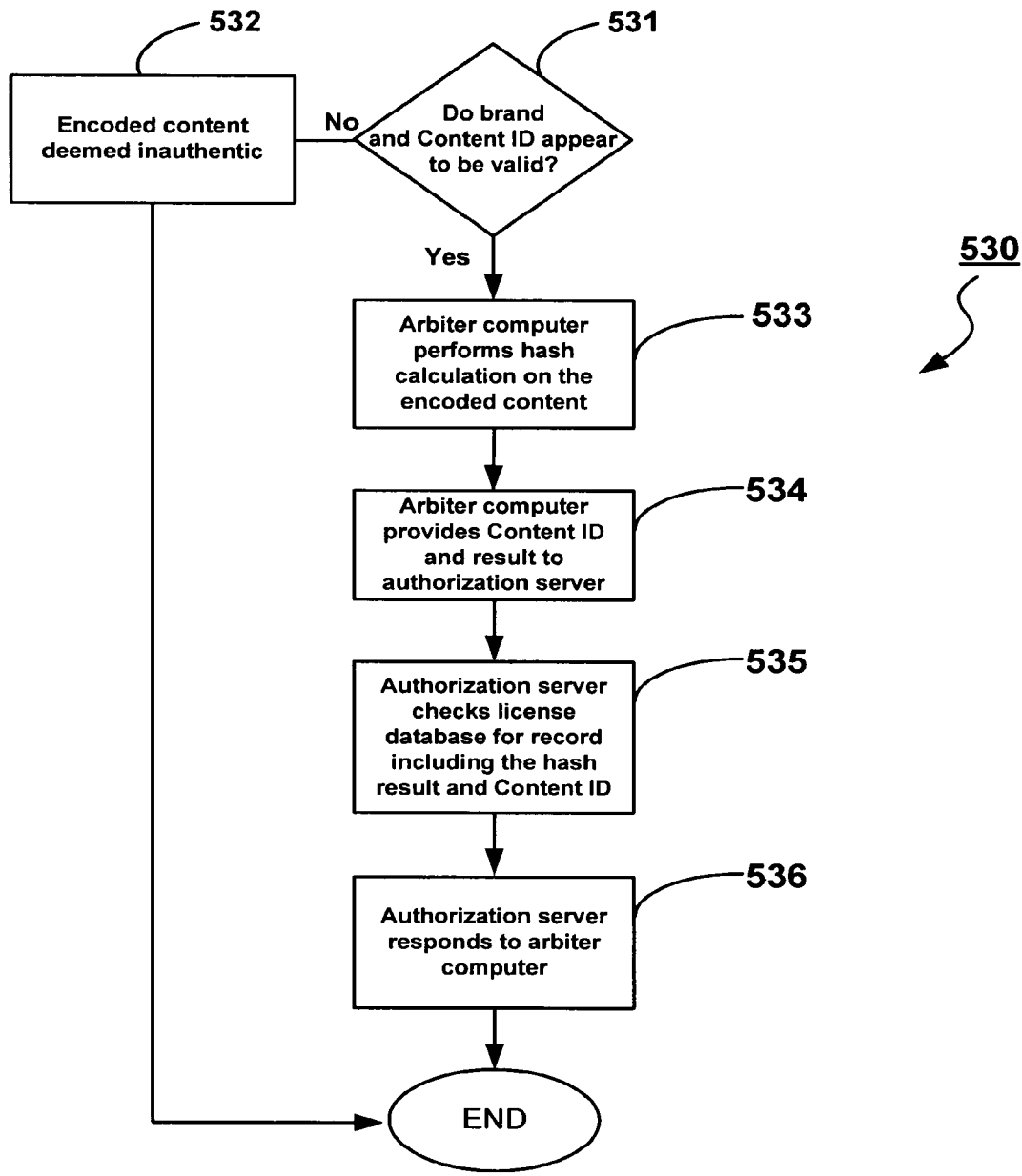
FIG. 12 illustrates the steps performed during checking of whether the encoded content is licensed in the method of FIG. 11.

FIG. 12 illustrates in more detail the determination of whether encoded content is authenticated. The arbiter computer determines whether the brand and the Content ID appear to be valid (step 531). If it appears that a brand was embedded in the encoded content, and the brand and/or the Content ID have been tampered with, the encoded content is deemed inauthentic (step 532). In this case, as the encoded content is deemed inauthentic, it is determined that distribution is not permitted. If, instead, the brand and the Content ID appear to be valid at step 531, the arbiter computer 404 then performs a hash calculation on the encoded content (step 533). The arbiter computer 404 provides the result to the authorization server 40 along with the Content ID parsed from the encoded content (step 534). Upon receiving the result from the arbiter computer 404, the authorization server 40 checks the license database 60 for a record including the Content ID and the hash calculation result (step 535). If the authorization server 40 does not find a record including the Content ID and the hash calculation result registered in the license database 60, the encoded content is deemed to be inauthentic. If, instead, the authorization server 40 finds a record including the Content ID and the hash calculation result in the license database 60, the encoded content is deemed to be authenticated and the authorization server 40 retrieves any permissions associated with the license from the record. Once the encoded content is determined to be authentic or inauthentic, the authorization server 40 responds back to the arbiter computer 404 with the result including any permissions which affect distribution (step 536).

In some cases, it is desirable to pre-customize portions of the encoded content that are distributed to end-users and still retain the ability to create a distinct version of the encoded content for a particular end-user.

Figure 13:
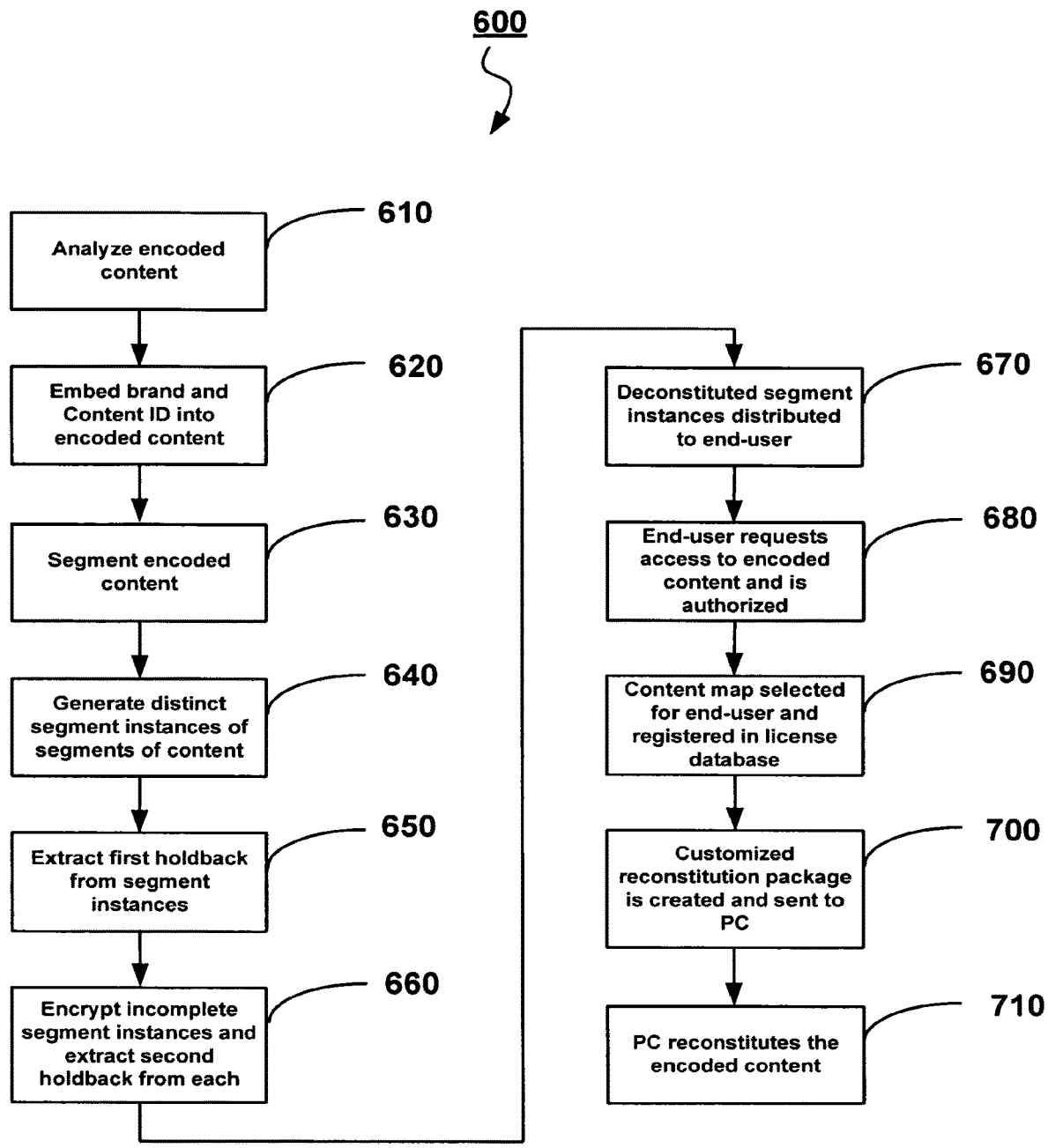
FIG. 13 shows the method of delivering encoded content in accordance with another embodiment.

Turning now to FIG. 13, a method of delivering encoded content in accordance with another embodiment is shown generally at 600. For illustration, the method 600 will be described with respect to video content that is encoded using the MPEG-2 standard. The method 600 commences with the analysis of the encoded content (step 610).

Figure 14:
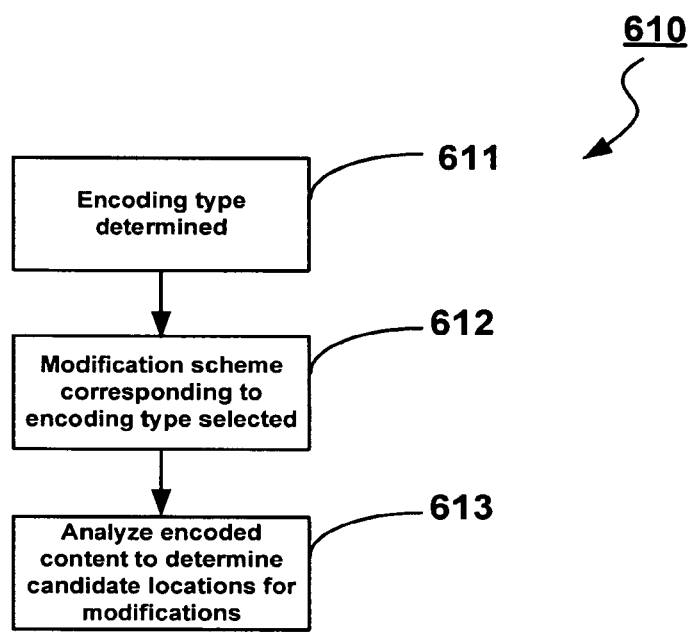
FIG. 14 shows the steps performed during analysis of the encoded content in the method of FIG. 13.

FIG. 14 illustrates the steps performed during analysis of the encoded content during step 610. The encoding type that is used to encode the content is determined (step 611). A modification scheme corresponding to the encoding type determined at step 611 is selected (step 612). The locations of where modifications may be made to the encoded content in accordance with the modification scheme depend on the type of encoding employed. For example, in the case of MPEG-2-encoded video, modifications are made to visual content and/or parameters of the I-frames and/or difference frames. These regions of the encoded content are identified by parsing the encoded content, and are flagged at this stage.

The encoded content is then analyzed to determine candidate locations for modifications (step 613). As it is desirable not to significantly affect the experience of an end-user, the encoded content is parsed and analyzed to identify candidate locations therein where modifications may be made in a manner that is not readily detectable to the end-user. These regions of the encoded content are flagged as candidate locations for modifications.

In particular, the method used to modify the encoded content in this embodiment is adjustment of the bias of frames. The bias of the frames provides a baseline against which image data is compared in order to characterize it during the encoding. Accordingly, video frames are identified as candidate locations for modifications.

Referring again to FIG. 13, once the encoded content has been analyzed, a brand and the Content ID are embedded into the encoded content (step 620). The encoded content is then segmented (step 630). The size of such segments is generally pre-determined, but can be modified depending on the position of candidate locations in the encoded content in order to ensure that each segment contains a desired number of such candidate locations. By providing a plurality of candidate locations for each segment, the variations possible of each segment through modification are numerous. Further, the probability of detection of such modifications by an end-user can be decreased.

Figure 15A:
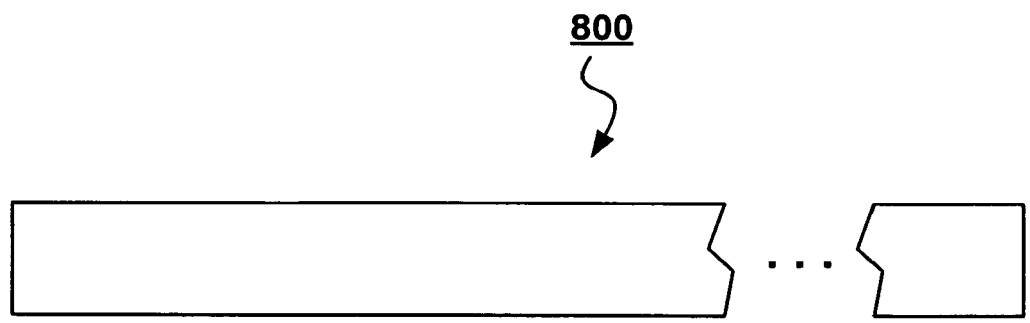
FIG. 15A is an abstract diagram of encoded content.
Figure 15B:
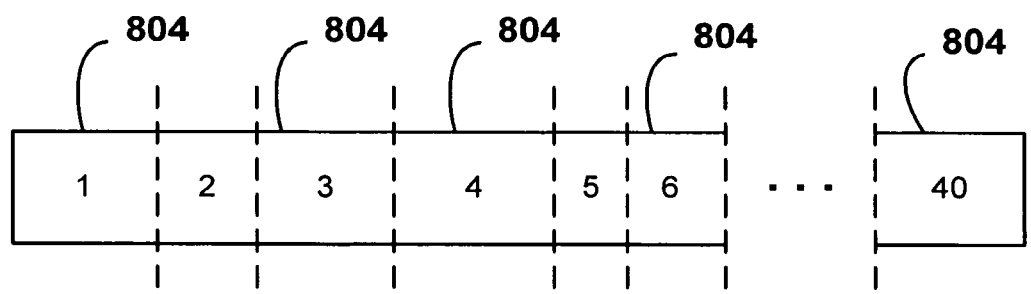
FIG. 15B illustrates segmentation of the encoded content of FIG. 15A.

FIGS. 15A and 15B represent encoded content 800 before and after segmentation respectively. The encoded content 800 has been divided into forty segments 804. Each segment 804 includes a set of video frames.

Referring again to FIG. 13, when the encoded content has been segmented, a set of distinct instances of each segment is generated (step 640). Each segment instance is generated by modifying the segment in at least one of the candidate locations identified in step 610. As there are a number of candidate locations for each segment, the segment instances are readily distinguished from each other.

In order to modify a segment to generate a particular segment instance thereof, the bias of one or more frames of the segment is modified. As there are a number of frames in each segment, and as the bias of the frames can be modified to varying degrees, a number of combinations of distinct instances can be generated for each segment.

Figure 16:
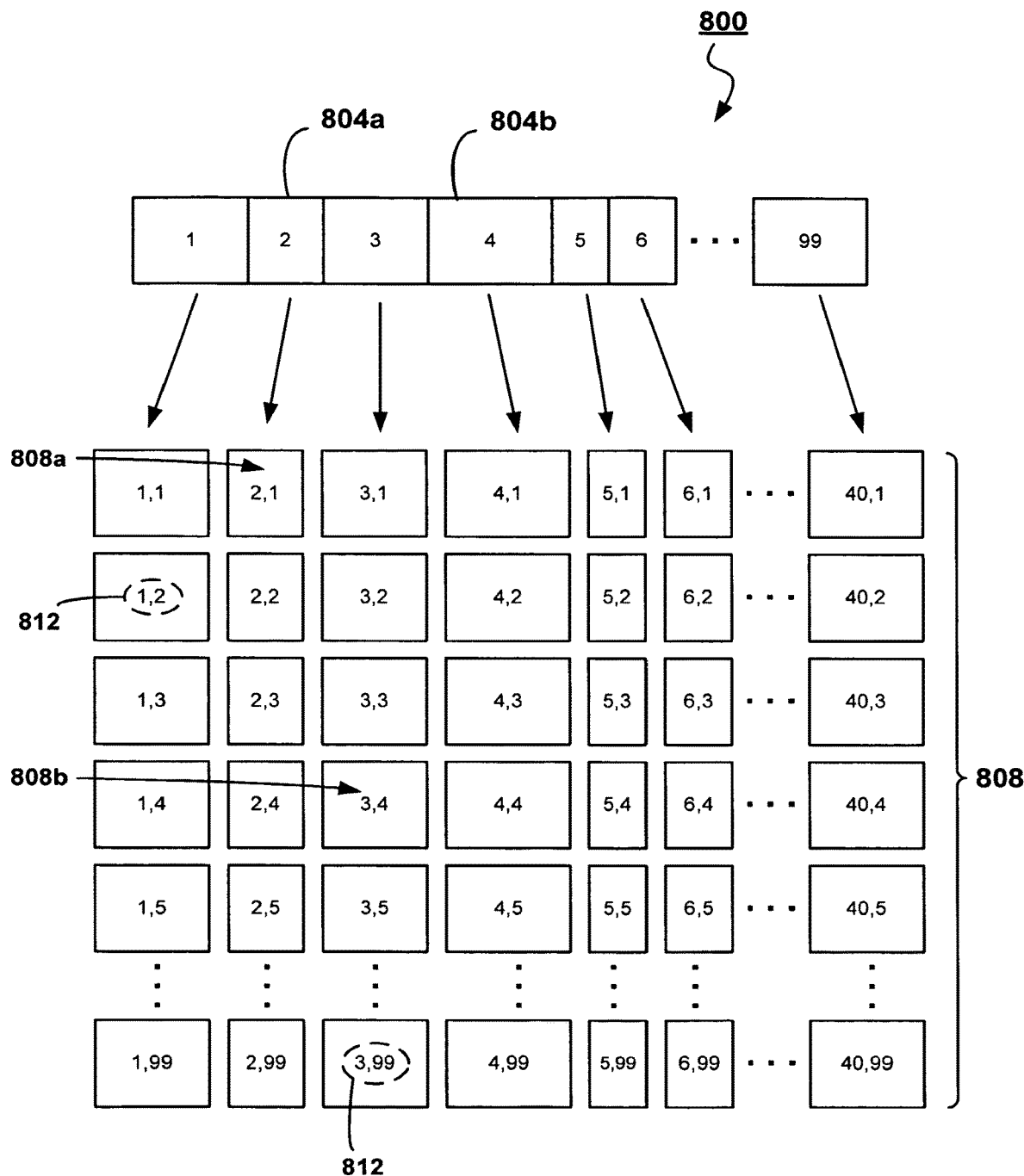
FIG. 16 illustrates a number of instances of the segments of the encoded content of FIG. 15B.

FIG. 16 illustrates the generation of a plurality of instances 808 for each segment 804 of the encoded content 800. As shown, ninety-nine segment instances 808 of each of the forty segments 804 are generated. Segment instance 808a is the first instance of a second segment 804a of the encoded content. Segment instance 808b is the fourth instance of a second segment 804b of the encoded content. Each segment instance is provided two coordinates 812. The first coordinate refers to the number of the segment to which the segment instance is related. The second coordinate is an identifier for the particular instance of the segment. As segment instances are generated for a segment, they are numbered sequentially, starting at 1.

Once the segment instances have been generated, hash calculations are performed on each of the segment instances and the results are stored in the license database 56. These results are used to authenticate the encoded content in a manner similar to that described hereinabove.

Referring again to FIG. 13, once the plurality of segment instances 808 has been generated, first holdbacks are extracted from each segment instance (step 650). A first holdback refers to a portion of encoded content that is withheld so as to not provide all of the encoded content, and to damage it. In this particular case, a first holdback is a portion of a segment instance that is arbitrarily selected and extracted from the segment instance. The first holdback extracted from a segment instance can be a single, contiguous set of bits or, alternatively, can be a number of bits extracted from a variety of positions within the segment instance.

During extraction of the first holdbacks from the segment instances, the first holdbacks are registered in the content completion database 52, along with the Content ID associated with the encoded content, and the coordinates associated with the particular segment instance from which each first holdback has been extracted. In addition, a first holdback reintegration map for reintegrating each first holdback into the corresponding segment instance is also stored in the content completion database 52. Each first holdback reintegration map specifies how the corresponding first holdback is to be reintegrated with the segment instances. In particular, each first holdback reintegration map indicates a set of positions in the corresponding segment instance, and the length of the portion of the corresponding first holdback to be inserted at the particular positions.

Figure 17:
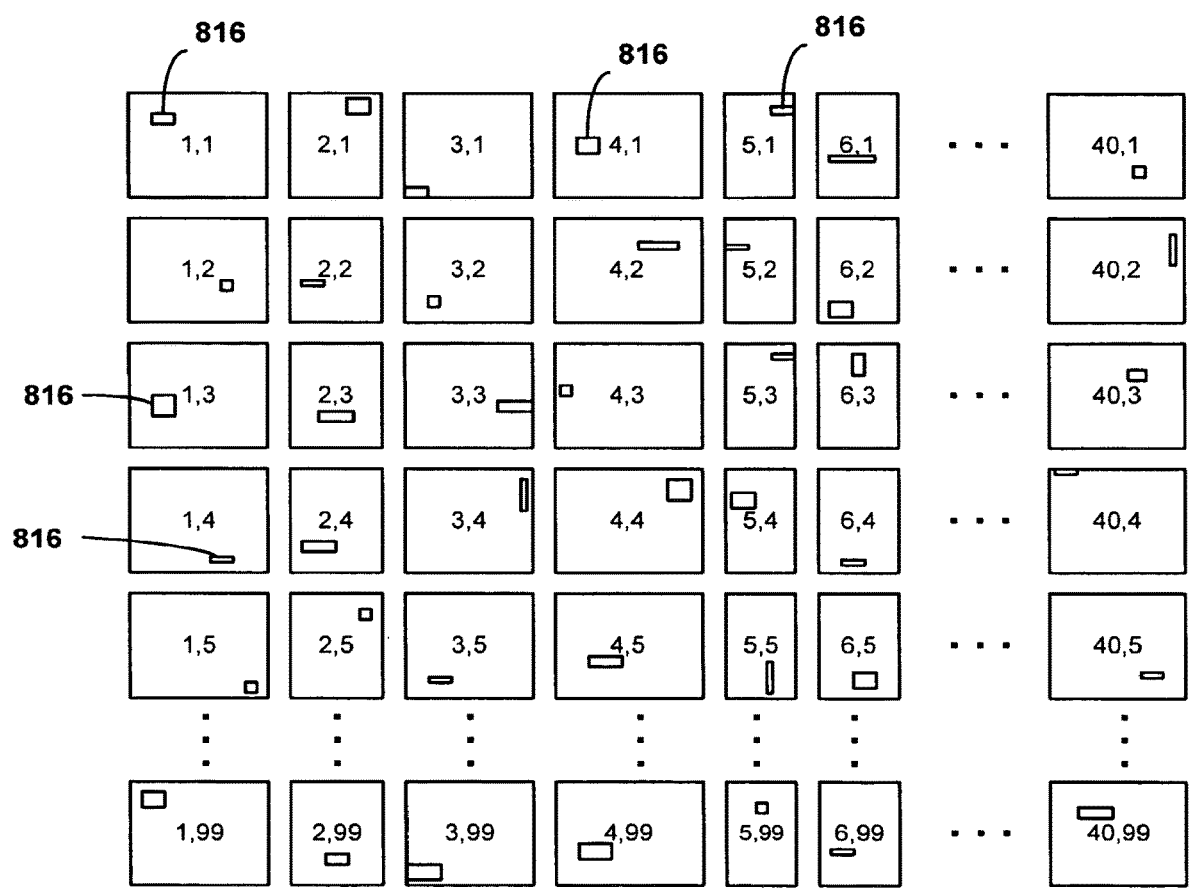
FIG. 17 illustrates the extraction of holdbacks from the instances of FIG. 16.

FIG. 17 illustrates the plurality of segment instances 808 after extraction of first holdbacks 812. As shown, the first holdbacks 812 can be extracted from differing positions in each of the segment instances 808. The segment instances represent deconstituted encoded content as they do not contain all of the information needed to decode the encoded content.

After extraction of the first holdbacks, the incomplete segment instances 808 are each cipher block chain encrypted using separate symmetric encryption keys and second holdbacks are extracted (step 660). Second holdback reintegration maps are generated to specify how the second holdbacks are to be reintegrated with the encrypted segment instances. As a result of the encryption, the segment instances are put into a non-standard file format and are given names and extensions that do not enable them to be readily associated with the encoded content to which they are related. By extracting the second holdback from the encrypted incomplete segment instances, their decryption without the second holdback is made infeasible. The encryption keys, the second holdbacks and the second holdback reintegration maps are then registered by the authorization server 40 in the security database 56, along with the Content ID of the encoded content and the two coordinates of the segment instance to which they correspond.

Referring back to FIG. 13, once the deconstituted encoded content is encrypted, it is placed onto an optical media disk and distributed to the end-user (step 670). The end-user requests access to the encoded content and is authorized (step 680). Steps 670 and 680 are performed in the same manner as are done in steps 140 and 150 respectively.

Referring back to FIG. 13, if access to the encoded content is authorized, the authorization server 40 generates a distinct content map for the license and registers it in the license database 48 (step 690). The content map is a mapping of the segment instances to direct the PC 36 to recombine certain segment instances to generate a copy of the encoded content that is distinct for the particular end-user, albeit incomplete due to the absence of the first holdbacks.

Figure 18:
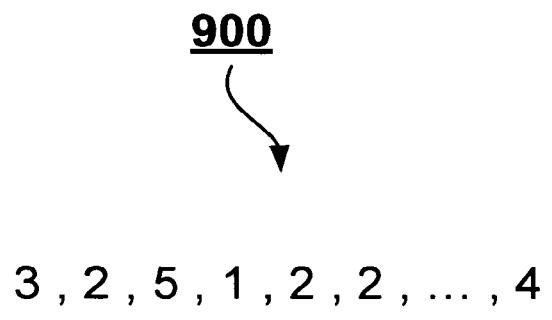

An exemplary content map 900 is shown in FIG. 18. The content map is a sequenced list of segment instances that are to be combined to form a distinct customized copy of the encoded content. The order of the elements corresponds with the segments to which they apply and each element indicates which instance is to be used for the particular segment. In content map 900, the first element, "3", indicates that the third segment instance is to be used for the first segment of the encoded content. Likewise, the second segment instance is to be used for the second segment of the encoded content as indicated by the "2" in the second position, and so on.

The authorization server 40 registers the license and the content map in the license database 60. The authorization server 40 registers the End-User ID, the Content ID of the newly licensed encoded content, the content map and a set of license data. The license data can include particulars of the license terms, the date the license was issued, etc.

The authorization server 40 then retrieves the first holdbacks, the first holdback reintegration maps, the encryption keys, the second holdbacks and the second holdback reintegration maps that correspond to the particular segment instances selected for the end-user 32 from the content completion database 52 and the security database 56 respectively, and creates and transmits a custom reconstitution package to the PC 36 (step 700). The custom reconstitution package includes the content map.

Upon receiving the custom reconstitution package, the PC 36 reconstitutes the encoded content (step 710).

Figure 19:
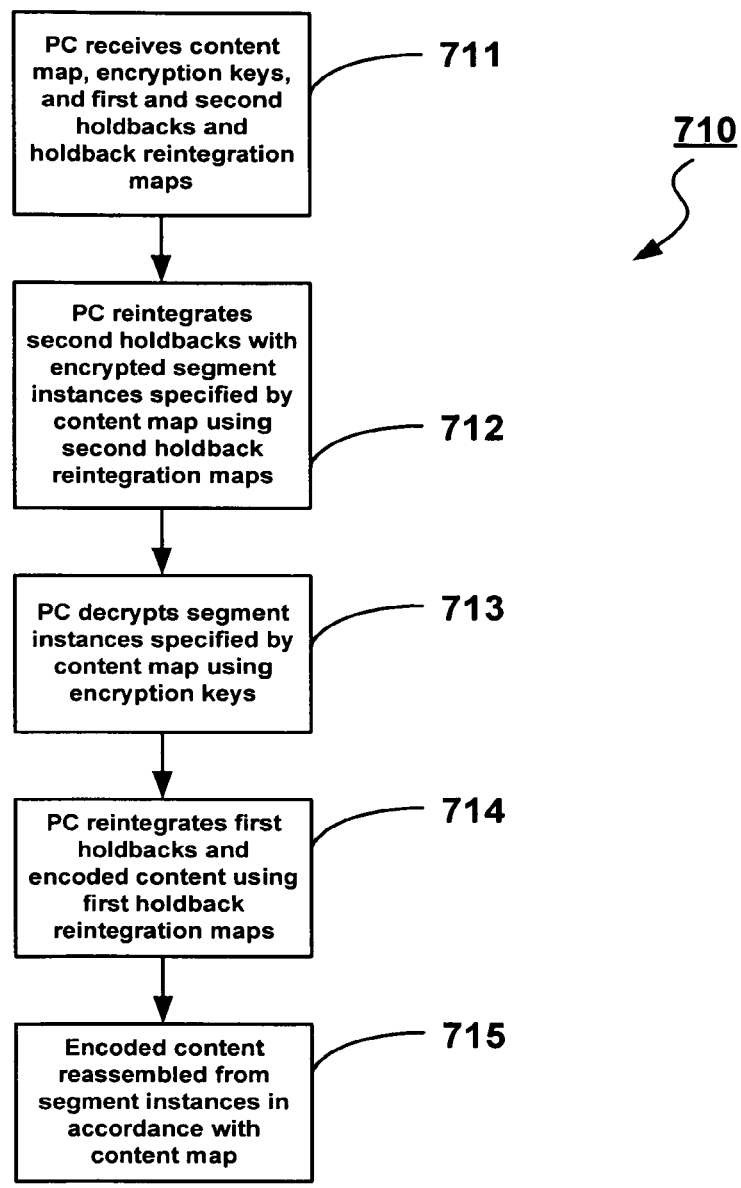
FIG. 19 is a flowchart of the steps performed during the decrypting, reconstituting and reassembling of encoded content in the method of FIG. 13.

FIG. 19 better illustrates the process of reconstituting the encoded content. The PC 36 receives the content map, the encryption keys, the second holdbacks, the second holdback reintegration maps, the first holdbacks and the first holdback reintegration maps (step 711). The PC 36 reintegrates the second holdbacks with the encrypted incomplete segment instances on the optical media disk 28 specified by the content map using the second holdback reintegration map (step 712). The PC 36 then decrypts the specified incomplete segment instances using the encryption keys (step 713). Next, the PC 36 reintegrates the first holdbacks into the specified incomplete segment instances in accordance with the first holdback reintegration maps (step 714). Upon reintegration of the first holdbacks, the encoded content is reassembled from the segment instances in accordance with the content map (step 715).

Figure 20:
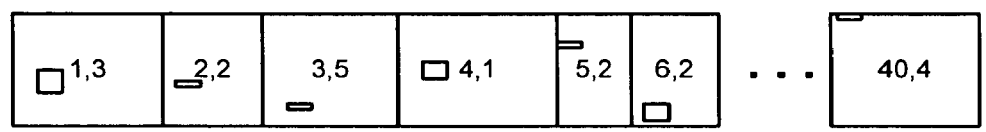
FIG. 20 shows the encoded content after reintegration of the holdback and assembly from the segment instances.

FIG. 20 illustrates an exemplary customized encoded content 1000. In particular, the completed encoded content 1000 was generated from the segment instances of FIG. 16 and the content map of FIG. 18.

The completed encoded content is thereafter stored on non-volatile storage of the PC 36 for accessing at a later time.

In a further embodiment, the encoded content in its entirety is stored by the authorization server. Upon authorization of an end-user to access content, a distinct customized copy of the encoded content is generated and made available to the user. The customized copy is generated at the time of authorization. The customization can be a steganographically placed in the encoded content. In this case, pre-analysis to identify areas of the encoded content that are suitable for customization can enable rapid steganographic customization. The customization can also provide an identifier of the license via visual, audio or other suitable markings. The end-user can be provided an interface for selecting encoded content that they wish to access, such as a webpage. Upon selecting encoded content that the end-user wishes to access, a customized copy of the selected encoded content is generated and delivered to the end-user.

In the above-described embodiments, if the encoded content is copied by or from the licensee, the customization(s) to the encoded content can permit proving that the copy was made from an instance of the encoded content licensed to that particular end-user.

While the invention has been described with reference to the above-described embodiments, other embodiments will occur to those of skill in the art. For example, while, in the above-described embodiments where incomplete content is provided, it can be distributed on an optical media disk, other methods of such distribution will occur to those skilled in the art. The incomplete content can be distributed electronically via a content distribution network and downloaded to a PC. Incomplete content can be pre-delivered and cached on a PC prior to receiving a request to access the particular encoded content.

The decoder may be made aware of the customization and the end-user to which the encoded content is licensed (and can be made to permit/deny use if the registered end-user of the application is not the end-user licensed for the encoded content).

Data can be extracted and reintegrated any number of times and in any number of manners. It may be desirable simply to cipher block chain encrypt the encoded content and then extract data therefrom without extracting a holdback from the encoded content prior to the encoded content's encryption. Alternatively, data can be extracted from the encoded content without the encoded content being subsequently encrypted such that the encoded content is damaged and cannot be feasibly restored without the reintegration of the data extracted. Instead of specifying absolute addresses where the extracted data is to be reintegrated, relative addresses can be used.

The holdback can be extracted from the encoded content in other manners. For example, in extracting the holdback, an XOR function can be applied to portions of the encoded content, thereby leaving the size of the encoded content intact. In this case, reintegration of the holdback would comprise performing an XOR function on those portions of the encoded content specified by the holdback package.

Customization of encoded content can be performed by the PC or other locations. The authorization server can provide instructions to the PC to customize encoded content available to the PC. The instructions can be encrypted to retain the confidentiality of the information, the application executing on the PC to perform such customizations can be made robust so as to resist tampering and the encoded content can be stored in a secure manner prior to customization. In the scenario where there is a trusted client with knowledge of the embedding process that is licensed to generate copies of encoded content for end-users, unregistered copies may appear for authentication by the arbiter computer. In these cases, the arbiter computer can determine the CCTIDs generated and register each copy of the encoded content as it becomes aware of them. The trusted client embeds both the identity of the trusted client and the end-users, along with a serial number so that the number of copies generated can be counted. In this manner, the encoded content generated by the trusted client can be tracked.

In some cases, it may be desirable to simply deconstitute the encoded content and not customize it. The reconstitution data in this scenario can be delivered upon licensing of the encoded content.

The CCTID can be digitally signed by the authorization server with standard private encryption key technology, enabling authentication of the CCTID.

Instead of customizing the encoded content with a CCTID or the like, the transaction particulars can be embedded directly into the holdback and/or the encoded content itself.

By generating a hash calculation for the particular encoded content and generating and storing the results for each end-user in the license database as encoded content is licensed, the authorization server can quickly determine whether the encoded content upon which the hash calculation was performed matches the end-user. If the End-User ID and Content ID are not found in a record of the license database, or if the result of the hash calculation provided by the application does not match that for the End-User, the authorization server can generate a result indicating that the end-user is not authorized to access the encoded content and returns the result to the application.

It can be desirable in some cases to perform hash calculations only on subsets of the encoded content where the information gathered by performing hash calculations on a subset of the encoded content is sufficient for the intended purpose.

Other characteristics of the encoded content can be modified in order to differentiate the encoded content. For example, the keystoning of video frames can be altered slightly.

Another method of modifying encoded content to create distinct instances while not significantly changing the end-user experience is by looking for and altering data in the encoded content that is superfluous. Many encoding standards call for compression algorithms whereby the resulting encoded content includes superfluous data. If little or no superfluous data exists in encoded content, it can be desirable to insert some otherwise superfluous space into which an identifier can be embedded.

Encoded content is usually compressed by the encoder, which makes choices affecting compression ratios when encoding the content, (and this also trades off quality when using lossy compression). Since these choices may all be made at compression time, it is possible to select the compression ratio such that there is always sufficient superfluous space remaining for customization.

Further, it is possible to embed a brand and Content ID into and/or customize encoded content by embedding one or more robust watermarks in the encoded content at compression time. This information can then be read from the encoded content by "partially trusted" agents, such as peer-to-peer ("P2P") file-sharing services and the like. The information in the watermark can be date-stamped and digitally signed. A robust digital watermark may be embedded by any algorithm that satisfies an arbitrary set of requirements for robustness, for example a few exemplary robust watermarking approaches are described in the document "Digital Watermarking Schemes for Multimedia Authentication", Chang-Tsun Li, Department of Computer Science, University of Warwick, 15 Feb. 2004.

Other methods of inserting brands and/or Content IDs will occur to those skilled in the art. For example, the content can be altered in a manner that is relatively innocuous to an end-user by modifying least-significant bits within the file to satisfy a parity test.

For video or still-image content, areas of relatively high complexity provide camouflage to minor modifications made. Similarly, in audio content, portions of relatively complex sounds enable modifications to be made without significantly impacting the experience for an end-user.

Where the encoded content is customized to embed a CCTID or the like, the customization could include redundant data to identify the CCTID so that the CCTID is still legible if some of the customizations in the encoded content are tampered with.

Where the encoded content is divided into a set of segments, distinct instances can be generated for a subset of said segments, with the remainder of the segments being used in their original form. The encoded content is then reassembled from the remainder of the segments being used in their original form and one of the instances corresponding with each segment for which instances were generated. In this manner, storage requirements for the unassembled components (the original segments and segment instances) can be reduced.

While the method and apparatus disclosed above are described with respect to monitoring file-sharing traffic, encoded content registered in storage or communicated via another type of network can be scanned and authenticated in a similar manner.

What is claimed is:

1. A computer-implemented method of delivering encoded content, comprising:
   encrypting the encoded content using a computing device, an encryption key and a cipher block chain method to provide encrypted encoded content;
   extracting, using the computing device, one or more segments of data from the encrypted encoded content to provide deconstituted encrypted encoded content;
   generating a reintegration map specifying how to reintegrate the extracted segments of data into the deconstituted encrypted encoded content to provide the encrypted encoded content;
prior to, or upon, authorization, distributing said deconstituted encrypted encoded content to a recipient; and
   upon authorization, transmitting, to the recipient, the reintegration man.

2. The method of claim 1, further comprising storing the deconstituted encrypted encoded content separately from the one or more segments of data and a reintegration map that specifies how to reintegrate the extracted segments of data into the deconstituted encrypted encoded content to provide the encrypted encoded content.

3. The method of delivering encoded content of claim 1, further comprising concatenating said deconstituted encrypted encoded content after said extracting and prior to said distributing.

4. The method of delivering encoded content of claim 1, further comprising:
   modifying the encoded content, using the computing device, such that for each recipient a distinct instance of said encoded content is created when the extracted one or more segments of data are reintegrated with the said distributed deconstituted encrypted encoded content.

5. The method of delivering encoded content of claim 4, wherein during said modifying the encoded content is modified to include steganographically-embedded information.

6. The method of delivering encoded content of claim 4, wherein during said modifying the encoded content is modified to include information identifying an authorized end-user.

7. The method of delivering encoded content of claim 6, wherein said information identifies a record in a license database identifying said authorized end-user.

8. The method of delivering encoded content of claim 7, wherein said license database also identifies distribution rights for said encoded content that the end-user is authorized to restore.

9. The method of delivering encoded content of claim 4, wherein during said modifying the encoded content is modified to include information identifying license terms.

10. The method of delivering encoded content of claim 1, comprising using an extraction scheme to extract the one or more segments of data from the encrypted encoded content, wherein the extraction scheme is based on encoded content type.

11. The method of delivering encoded content of claim 1, wherein said extracting of the one or more segments of data comprises extracting a plurality of selected data segments from the encrypted encoded content.

12. The method of delivering encoded content of claim 1, the method further comprising concatenating said extracted one or more segments of data after said extracting and prior to said transmitting.

13. The method of delivering encoded content of claim 1, wherein said encoded content that is to be delivered comprises codec encoded content that includes a header and one or more I-frames, and wherein the step of extracting one or more segments of data comprises extracting: (i) a block of one or more bytes from a location in the header, and (ii) a block of one or more bytes from an I-frame.

14. The method of delivering encoded content of claim 1, wherein the encoded content is generated by removing a selected subset of data from a digital representation of content.

15. A non-transitory computer-readable medium, comprising instructions that, when executed by a processor of a computing device, cause the computing device to:
   encrypt encoded content using a computing device, an encryption key and a cipher block chain method to provide encrypted encoded content;
   extract, using the computing device, one or more segments of data from the encrypted encoded content to provide deconstituted encrypted encoded content;
   generate a reintegration map specifying how to reintegrate the extracted segments of data into the deconstituted encrypted encoded content to provide the encrypted encoded content;
   prior to, or upon, authorization, distribute said deconstituted encrypted encoded content to a recipient; and
   upon authorization, transmit, to the recipient, the reintegration map.

* * * * *